US012316947B2

(12) United States Patent
Kim et al.

(10) Patent No.: US 12,316,947 B2
(45) Date of Patent: May 27, 2025

(54) ELECTRONIC DEVICE COMPRISING ANTENNA MODULE DISPOSED IN CAMERA MODULE

(71) Applicant: SAMSUNG ELECTRONICS CO., LTD., Suwon-si (KR)

(72) Inventors: Jeongsik Kim, Suwon-si (KR); Muyeol Lee, Suwon-si (KR); Eunsoo Park, Suwon-si (KR); Yonglak Cho, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 18/077,804

(22) Filed: Dec. 8, 2022

(65) Prior Publication Data
US 2023/0099993 A1 Mar. 30, 2023

Related U.S. Application Data

(63) Continuation of application No. PCT/KR2021/006207, filed on May 18, 2021.

(30) Foreign Application Priority Data

Jun. 8, 2020 (KR) .................. 10-2020-0069197

(51) Int. Cl.
*H04N 23/57* (2023.01)
*G01S 5/02* (2010.01)
(Continued)

(52) U.S. Cl.
CPC .......... *H04N 23/61* (2023.01); *G01S 5/0205* (2013.01); *G01S 5/0284* (2013.01); *H01Q 1/243* (2013.01);
(Continued)

(58) Field of Classification Search
CPC ........ H04N 23/61; H04N 23/53; H04N 23/55; H04N 23/90; H04N 23/57; H04N 23/51;
(Continued)

(56) References Cited

U.S. PATENT DOCUMENTS

2008/0297401 A1  12/2008  Nishida
2017/0115941 A1   4/2017  Kim et al.
(Continued)

FOREIGN PATENT DOCUMENTS

CN    208433997 U  *  1/2019
EP    3 869 772 A1    8/2021
(Continued)

OTHER PUBLICATIONS

English translation of CN 208433997 (Year: 2019).*
(Continued)

*Primary Examiner* — John R Schnurr
(74) *Attorney, Agent, or Firm* — Sughrue Mion, PLLC

(57) ABSTRACT

An electronic device includes: a housing; a first camera module disposed in the housing, the first camera module including: a first camera housing; a prism disposed in the first camera housing and configured to refract light received from outside of the electronic device; and an image sensor disposed in the first camera housing and configured to obtain the light through the prism; and an antenna module configured to transmit or receive a signal, wherein at least a portion of the antenna module is disposed on the first camera module.

11 Claims, 30 Drawing Sheets

(51) Int. Cl.
  *H01Q 1/24* (2006.01)
  *H01Q 9/04* (2006.01)
  *H01Q 21/00* (2006.01)
  *H04N 23/53* (2023.01)
  *H04N 23/55* (2023.01)
  *H04N 23/61* (2023.01)
  *H04N 23/90* (2023.01)

(52) U.S. Cl.
  CPC ........... *H01Q 9/0407* (2013.01); *H01Q 21/00* (2013.01); *H04N 23/53* (2023.01); *H04N 23/55* (2023.01); *H04N 23/90* (2023.01)

(58) Field of Classification Search
  CPC .... G01S 5/0205; G01S 5/0284; G01S 13/765; H01Q 1/243; H01Q 9/0407; H01Q 21/00; H01Q 9/0421; H01Q 9/0457; H01Q 21/065; H01Q 5/25; H04M 2250/12; H04M 1/0264
  See application file for complete search history.

(56) References Cited

U.S. PATENT DOCUMENTS

| | | | |
|---|---|---|---|
| 2018/0076875 A1 | 3/2018 | Haverinen et al. | |
| 2018/0203328 A1 | 7/2018 | Kang et al. | |
| 2018/0254870 A1 | 9/2018 | Dutz et al. | |
| 2019/0097317 A1 | 3/2019 | Di Nallo et al. | |
| 2019/0195982 A1 | 6/2019 | El Assaad | |
| 2020/0021011 A1* | 1/2020 | Cooper | G01S 3/46 |
| 2021/0136261 A1 | 5/2021 | Lee | |
| 2021/0159596 A1* | 5/2021 | Park | H01Q 3/24 |
| 2021/0258459 A1* | 8/2021 | Zhang | H04N 23/67 |
| 2022/0060230 A1 | 2/2022 | Na et al. | |

FOREIGN PATENT DOCUMENTS

| | | |
|---|---|---|
| EP | 3 939 340 A1 | 1/2022 |
| JP | 2016-36106 A | 3/2016 |
| JP | 2017-163406 A | 9/2017 |
| KR | 10-2018-0085460 A | 7/2018 |
| KR | 10-2019-0026272 A | 3/2019 |
| KR | 20190026272 A * | 3/2019 |
| KR | 10-2019-0067720 A | 6/2019 |
| KR | 10-2019-0119832 A | 10/2019 |
| KR | 10-2020-0031230 A | 3/2020 |
| WO | 2019/045547 A1 | 3/2019 |
| WO | 2020/054973 A1 | 3/2020 |
| WO | 2020/093819 A1 | 5/2020 |

OTHER PUBLICATIONS

International Search Report (PCT/ISA/210) issued Aug. 31, 2021 by the International Searching Authority in International Patent Application No. PCT/KR2021/006207.
Written Opinion (PCT/ISA/237) issued Aug. 31, 2021 by the International Searching Authority in International Patent Application No. PCT/KR2021/006207.
Communication dated Sep. 29, 2023, issued by the European Patent Office in European Application No. 21822823.7.
Francisco Molina Martel et al., "Augmented Reality and UWB Technology Fusion: Localization of Objects with Head Mounted Displays", Proceedings of the 31st International Technical Meeting of the Satellite Division of the Institute of Navigation (ION GNSS+ 2018), Oct. 26, 2018, pp. 685-692, DOI: 10.33012/2018.16046, XP093121296.
Arnis Cirluis, "Ultra Wideband Tracking Potential for Augmented Reality Environments", International Conference on Augmented Reality, Virtual Reality, and Computer Graphics, Lecture Notes in Computer Science (LNIP, vol. 11614), Jul. 28, 2019, pp. 126-136, DOI: 10.1007/978-3-030-25999-0_11, XP047515281.
Communication issued on Feb. 2, 2024 by the European Patent Office in European Application No. 21822823.7.
Communication issued Nov. 12, 2024 by the Korean Intellectual Property Office in Korean Patent Application No. 10-2020-0069197.

\* cited by examiner

# ELECTRONIC DEVICE COMPRISING ANTENNA MODULE DISPOSED IN CAMERA MODULE

CROSS-REFERENCE TO RELATED APPLICATIONS

This application is by-pass continuation application of International Application No. PCT/KR2021/006207, filed on May 18, 2021, which based on and claims priority to Korean Patent Application No. 10-2020-0069197, filed on Jun. 8, 2020, in the Korean Intellectual Property Office, the disclosures of which are incorporated by reference herein in their entireties.

BACKGROUND

1. Field

The disclosure relates to an electronic device including an antenna module.

2. Description of Relate Art

An electronic device may be a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, etc. For example, electronic devices may output stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, or a scheduling or e-wallet function.

With the development of digital camera manufacturing technology, an electronic device may be equipped with a compact and lightweight camera module. Users may take advantage of various functionalities of an electronic device with camera modules, such as photographing, video recording, video call, augmented reality (AR), etc., in a convenient manner, while carrying it all the time.

In recent years, electronic devices including multiple cameras are in wide use. The electronic device may include, e.g., a camera module including a wide-angle lens and a telephoto lens. The electronic device may obtain a wide-angle image by capturing a wide-range scene around the electronic device using the wide-angle lens or obtain a telescopic image by capturing a scene corresponding to a location relatively far from the electronic device, using the telescopic lens.

Electronic devices with communication functionality, such as portable terminals, are being reduced in size and weight to maximize user portability and convenience and, for high performance, pack integrated components in a small space. The electronic device may include a plurality of cameras considering various capture conditions. In particular, the electronic device may include a wide-angle camera for capturing a wide-range scene around the electronic device. The wide-angle camera may capture images in a wide range (e.g., 120 degrees to 180 degrees).

The electronic device may include an antenna to transmit signals to and receive signals from an external electronic device. As the antenna is spaced further apart from the camera, the effective range of the antenna may differ from the range capturable by the camera, and the antenna may fail to detect the signal from the external electronic device position in the angle of view of the wide-angle camera.

SUMMARY

Provided are an electronic device including an antenna disposed adjacent to a camera module to recognize an object in the angle of view range of the camera module.

Additional aspects will be set forth in part in the description which follows and, in part, will be apparent from the description, or may be learned by practice of the presented embodiments.

According to an aspect of the disclosure, an electronic device includes: a housing; a first camera module disposed in the housing, the first camera module including: a first camera housing; a prism disposed in the first camera housing and configured to refract light received from outside of the electronic device; and an image sensor disposed in the first camera housing and configured to obtain the light through the prism; and an antenna module configured to transmit or receive a signal, wherein at least a portion of the antenna module is disposed on the first camera module.

The electronic device may further include a camera module including the first camera module and a camera window forming at least a portion of an exterior of the camera module, at least the portion of the antenna module may be disposed between the camera window and the first camera module.

The first camera module includes a first lens assembly disposed between the prism and the image sensor and facing the image sensor, and the camera module may further include a second camera module facing the camera window.

The camera window may include: a first transparent area configured to provide a path of light towards the first lens assembly; at least one second transparent area configured to provide a path of light towards the second camera module; and a printing area surrounding the first transparent area and the at least one second transparent area, and at least the portion of the antenna module may be disposed between the printing area and the first camera module.

The housing may include a front plate and a rear plate, and at least the portion of the antenna module may be disposed between the rear plate and the first camera module.

The first camera module may include a first camera supporting member supporting the first camera module, and the antenna module may be disposed on the first camera supporting member.

The antenna module may include a first patch antenna and a second patch antenna that is spaced apart from the first patch antenna.

The antenna module may further include a third patch antenna that is spaced apart from the first patch antenna, and the second patch antenna and the third patch antenna are arranged in a direction substantially perpendicular to the first patch antenna.

The electronic device may further include: a sensor module configured to detect an angle of the electronic device from a ground; a processor configured to determine a mounting mode of the electronic device based on the angle; an antenna circuit electrically connected with the processor; and a switching circuit configured to selectively connect the second patch antenna or the third patch antenna to the antenna circuit, and the processor may be further configured to: control the switching circuit in a first connection state of being electrically connected with the first patch antenna and the second patch antenna in a first mounting mode; and control the switching circuit in a second connection state of being electrically connected with the first patch antenna and the third patch antenna in a second mounting mode.

According to an aspect of the disclosure, electronic device includes: at least one camera module; at least one patch antenna; a display; and at least one processor configured to: control the at least one camera module to obtain an image; broadcast a ranging request message through the at least one patch antenna; receive, through the at least one patch antenna, a ranging response message from a first external electronic device that received the ranging request message; identify a relative position of the first external electronic device with respect to the electronic device, based on the ranging response message; identify a first area corresponding to the first external electronic device in the image, based on the relative position of the first external electronic device with respect to the electronic device; and control the display to display a graphic object corresponding to the first external electronic device overlaid on the first area of the image.

The electronic device may further include a sensor module, the at least one patch antenna may include a plurality of patch antennas, and the at least one processor may be further configured to: identify a mounting mode of the electronic device through the sensor module; activate at least two patch antennas corresponding to the identified mounting mode among the plurality of patch antennas, the at least two patch antennas including a first patch antenna; broadcast the ranging request message through the first patch antenna; and receive the ranging response message through the activated at least two patch antennas.

The plurality of patch antennas may include the first patch antenna, a second patch antenna that is spaced apart from the first patch antenna in a first direction, and a third patch antenna that is spaced apart from the first patch antenna in a second direction, the first direction being substantially perpendicular to the second direction, and the at least one processor may be further configured to: activate the first patch antenna and the second patch antenna based on the identified mounting mode corresponding to a state in which the first direction is parallel to a ground; and activate the first patch antenna and the third patch antenna based on the identified mounting mode corresponding to a state in which the second direction is parallel to the ground.

The at least one processor may be further configured to identify a distance between the first external electronic device and the electronic device by a single sided-two way ranging (SS-TWR) scheme or a double sided-two way ranging (DS-TWR) scheme to identify the relative position of the first external electronic device with respect to the electronic device.

The at least one processor may be further configured to determine the graphic object based on the ranging response message, and the graphic object indicates at least one of a graphic image preset by a user of the first external electronic device, a name preset by the user of the first external electronic device, or text preset by the user of the first external electronic device.

The first area may be a face area of a person closest to a position of the first external electronic device in the image.

According to one or more embodiments of the disclosure, the electronic device may include the antenna module disposed on the camera module including a prism, reducing the physical spacing between the camera module and the antenna. As the physical spacing between the camera module and the antenna reduces, the rate at which the capturing angle of view of the camera module is included in the angle of arrival may increase.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
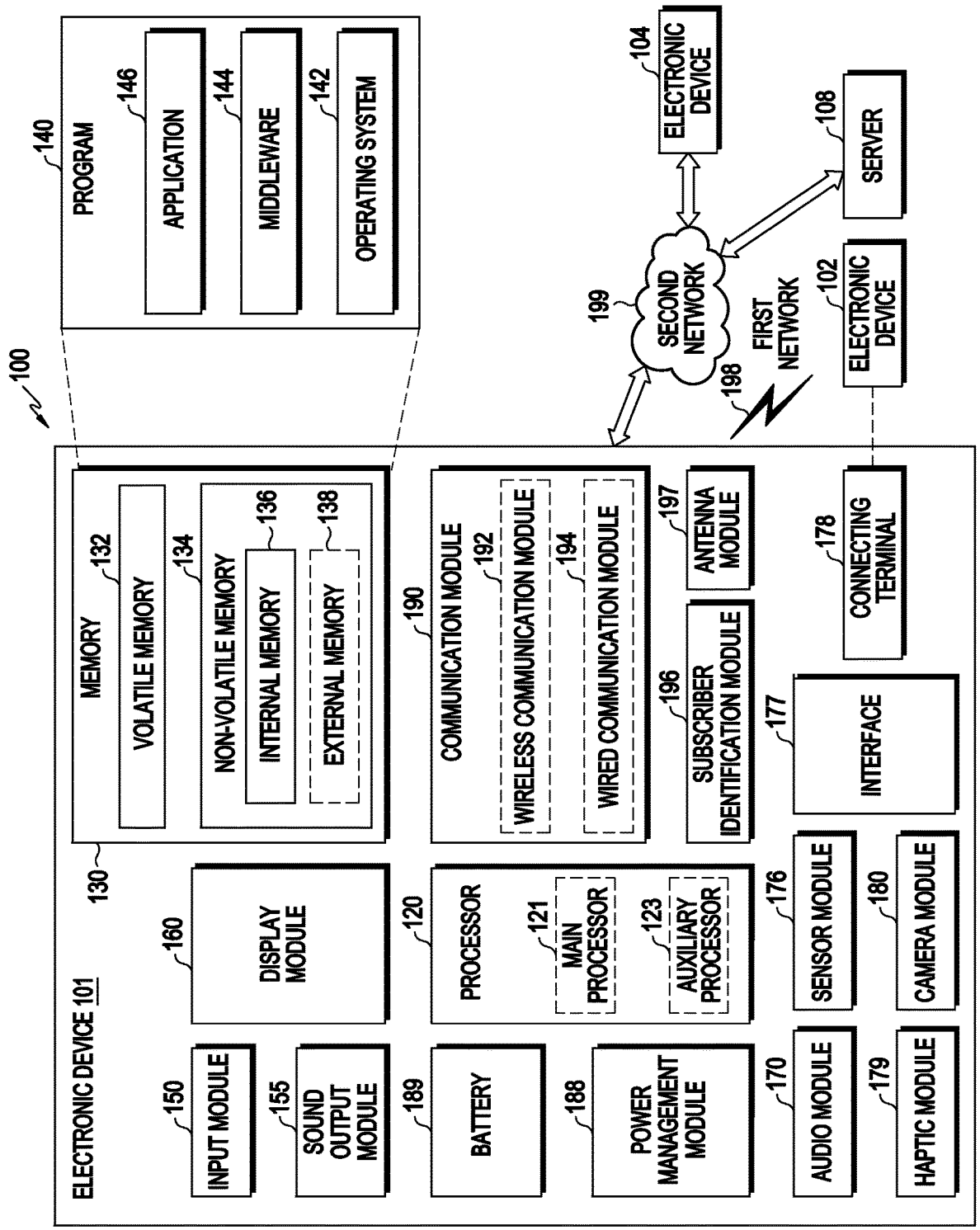
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
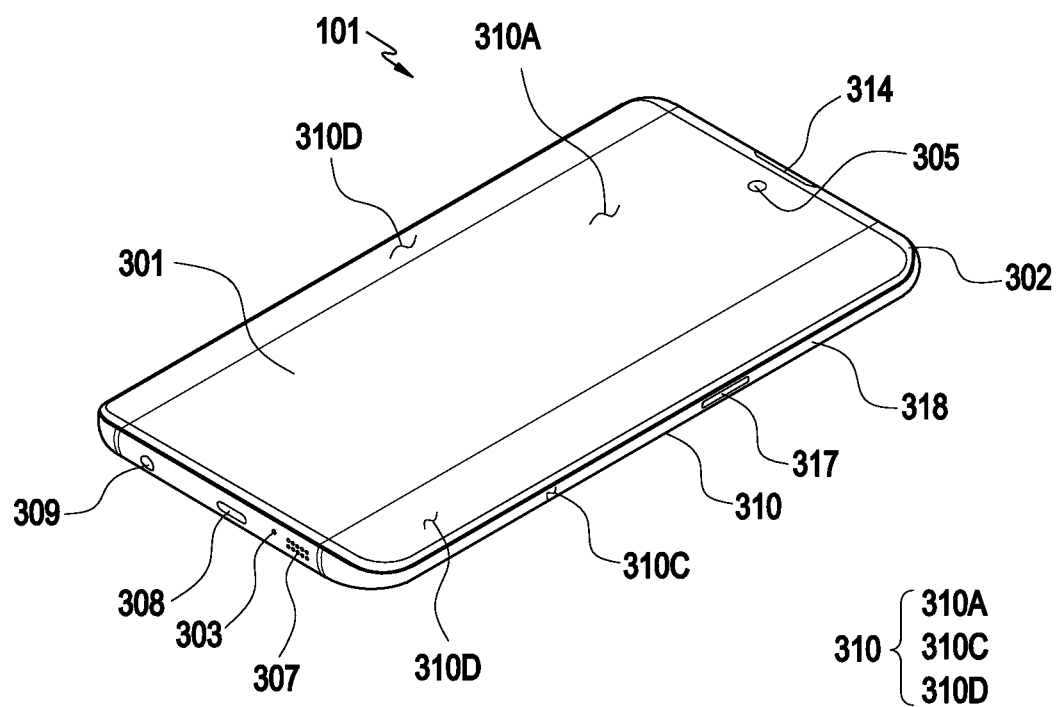
FIG. 2 is a front perspective view illustrating an electronic device according to various embodiments of the disclosure.
Figure 3:
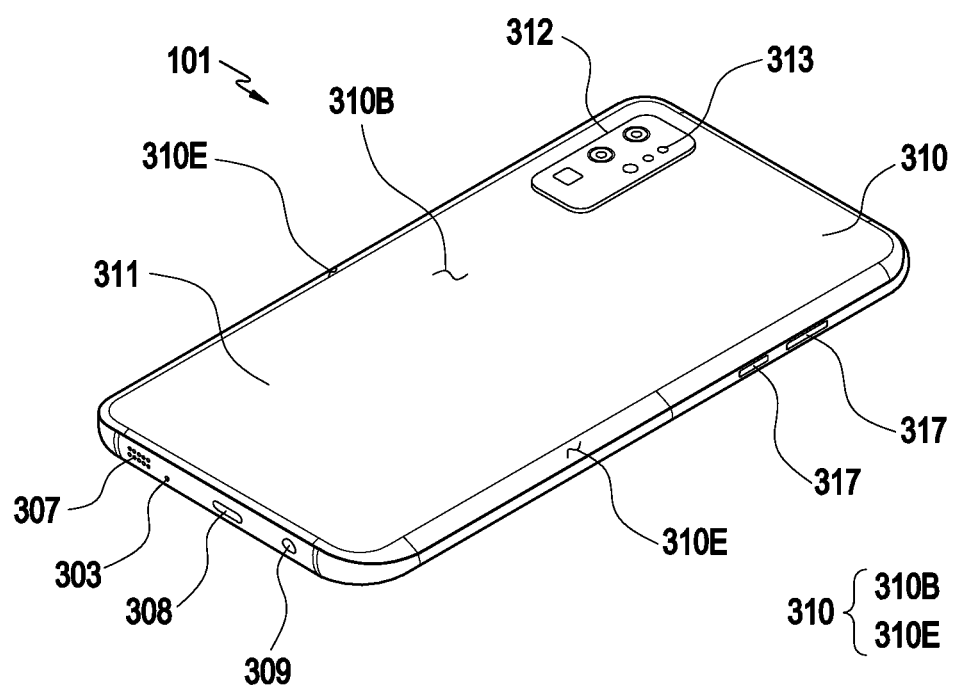
FIG. 3 is an rear perspective view illustrating an electronic device according to various embodiments of the disclosure.

FIG. 2 is a front perspective view illustrating an electronic device 101 according to various embodiments of the disclosure. FIG. 3 is a rear perspective view illustrating an electronic device 101 according to various embodiments of the disclosure.

Referring to FIGS. 2 and 3, according to an embodiment, an electronic device 101 may include a housing 310 with a front surface 310A, a rear surface 310B, and a side surface 310C surrounding a space between the front surface 310A and the rear surface 310B. According to another embodiment, the housing 310 may be a structure forming part of the front surface 310A, the rear surface 310B, and the side surface 310C of FIG. 2. According to an embodiment, at least part of the front surface 310A may have a substantially transparent front plate 302 (e.g., a glass plate or polymer plate including various coating layers). The rear surface 310B may be formed by a rear plate 311. The rear plate 311 may be formed of, e.g., laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to an embodiment, the rear plate 311 and the side bezel plate 318 may be integrally formed together and include the same material (e.g., metal, such as aluminum, or ceramic).

In the embodiment illustrated in FIG. 2, the front plate 302 may include two first edge areas 310D, which seamlessly and bendingly extend from the front surface 310A to the rear plate 311, on both the long edges of the front plate 302. In the embodiment (refer to FIG. 3) illustrated, the rear plate 311 may include two second edge areas 310E, which seamlessly and bendingly extend from the rear surface 310B to the front plate, on both the long edges. According to an embodiment, the front plate 302 (or the rear plate 311) may include only one of the first edge areas 310D (or the second edge areas 310E). Alternatively, the first edge areas 310D or the second edge areas 301E may partially be excluded. According to an embodiment, at side view of the electronic device 101, the side bezel structure 318 may have a first thickness (or width) for sides that do not have the first edge areas 310D or the second edge areas 310E and a second thickness, which is smaller than the first thickness, for sides that have the first edge areas 310D or the second edge areas 310E.

According to an embodiment, the electronic device 101 may include at least one of a display 301, audio modules 303, 307, and 314 (e.g., the audio module 170 of FIG. 1), a sensor module (e.g., the sensor module of FIG. 1). 176), camera modules 305, 312, and 313 (e.g., the camera module 180 of FIG. 1), a key input device 317 (e.g., the input module 150 of FIG. 1), and connector holes 308 and 309 (e.g., the connecting terminal 178 of FIG. 1). According to an embodiment, the electronic device 101 may exclude at least one (e.g., the connector hole 309) of the components or may add other components.

According to an embodiment, the display 301 may be visually revealed through, e.g., a majority portion of the front plate 302. According to an embodiment, at least a portion of the display 301 may be exposed through the front plate 302 forming the front surface 310A and the first edge areas 310D. According to an embodiment, the edge of the display 301 may be formed to be substantially the same in shape as an adjacent outer edge of the front plate 302. According to another embodiment, the interval between the outer edge of the display 301 and the outer edge of the front plate 302 may remain substantially even to give a larger area of exposure the display 301.

According to an embodiment, the surface (or the front plate 302) of the housing 310 may include a screen display area formed as the display 301 is visually exposed. For example, the screen display area may include the front surface 310A and first edge areas 310D.

According to an embodiment, a recess or opening may be formed in a portion of the screen display area (e.g., the front surface 310A or the first edge area 310D) of the display 301, and at least one or more of the audio module 314, sensor module, light emitting device, and camera module 305 may be aligned with the recess or opening. According to another embodiment, at least one or more of the audio module 314, sensor module, camera module 305, fingerprint sensor, and light emitting device may be included on the rear surface of the screen display area of the display 301.

According to an embodiment, the display 301 may be coupled with or adjacent to a touch detecting circuit, a pressure sensor capable of measuring the strength (pressure) of touches, and/or a digitizer for detecting a magnetic field-type stylus pen.

According to an embodiment, at least part of the key input device 317 may be disposed in the first edge areas 310D and/or the second edge areas 310E.

According to an embodiment, the audio modules 303, 307, and 314 may include, e.g., a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. In some embodiments, the speaker holes 307 and 314 and the microphone hole 303 may be implemented as a single hole, or a speaker may be included without the speaker holes 307 and 314 (e.g., a piezo speaker).

According to an embodiment, the sensor modules may generate an electrical signal or data value corresponding to an internal operating state or external environmental state of the electronic device 101. The sensor modules may include a first sensor module (e.g., a proximity sensor) and/or a second sensor module (e.g., a fingerprint sensor) disposed on the front surface 310A of the housing 310 and/or a third sensor module (e.g., an HRM sensor) and/or a fourth sensor module (e.g., a fingerprint sensor) disposed on the rear surface 310B of the housing 310. In an embodiment, the fingerprint sensor may be disposed on the rear surface 310B as well as on the front surface 310A (e.g., the display 301) of the housing 310. The electronic device 101 may further include sensor modules, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 305, 312, and 313 may include a first camera module 305 disposed on the front surface 310A of the electronic device 101, and a rear camera device 312 and/or a flash 313 disposed on the rear surface 310B. The camera modules 305 and 312 may include one or more lenses, an image sensor, and/or an image signal processor. The flash 313 may include, e.g., alight emitting diode (LED) or a xenon lamp. According to an embodiment, two or more lenses (an infrared (IR) camera, a wide-angle lens, and a telephoto lens) and image sensors may be disposed on one surface of the electronic device 101.

According to an embodiment, the key input device 317 may be disposed on the side surface 310C of the housing 310. According to an embodiment, the electronic device 101 may exclude all or some of the above-mentioned key input devices 317 and the excluded key input devices 317 may be implemented in other forms, e.g., as soft keys, on the display 301.

According to an embodiment, the light emitting device may be disposed on, e.g., the front surface 310A of the housing 310. The light emitting device may provide, e.g., information about the state of the electronic device 101 in the form of light. According to another embodiment, the light emitting device may provide a light source that interacts with, e.g., the first camera module 305. The light emitting device may include, e.g., a light emitting diode (LED), an infrared (IR) LED, and/or a xenon lamp.

According to an embodiment, the connector holes 308 and 309 may include a first connector hole 308 for receiving a connector (e.g., a universal serial bus (USB) connector) for transmitting or receiving power and/or data to/from an external electronic device and/or a second connector hole (e.g., an earphone jack) 309 for receiving a connector for transmitting or receiving audio signals to/from the external electronic device.

Figure 4:
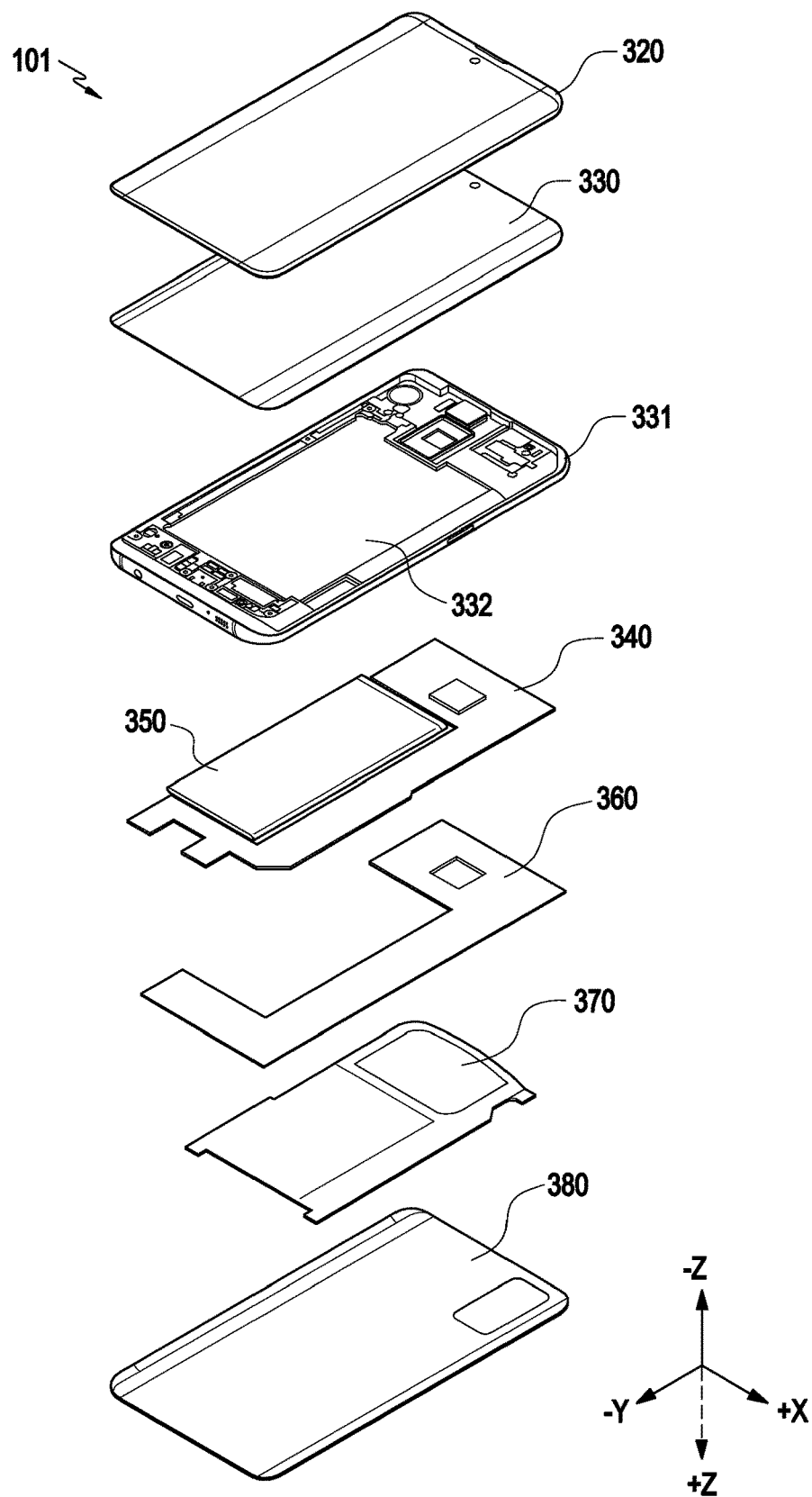
FIG. 4 is an exploded perspective view illustrating an electronic device according to various embodiments of the disclosure.

FIG. 4 is an exploded perspective view illustrating an electronic device 101 according to various embodiments of the disclosure.

Referring to FIG. 4, an electronic device 101 (e.g., the electronic device 101 of FIGS. 2 to 3) may include a front plate 320 (e.g., the front plate 302 of FIG. 2), a display 330 (e.g., the display 301 of FIG. 2), a first supporting member 332 (e.g., a bracket), a main printed circuit board 340, a battery 350, a second supporting member 360 (e.g., a rear case), an antenna 370, and a rear plate 380 (e.g., the rear plate 311 of FIG. 3). According to an embodiment, the electronic device 101 may exclude at least one (e.g., the first supporting member 332 or the second supporting member 360) of the components or may add other components. At least one of the components of the electronic device 101 may be the same or similar to at least one of the components of the electronic device 101 of FIG. 2 or 3 and no duplicate description is made below.

According to an embodiment, the first supporting member 332 may be disposed inside the electronic device 101 to be connected with the side bezel structure 331 or integrated with the side bezel structure 331. The first supporting member 332 may be formed of, e.g., a metal and/or non-metallic material (e.g., polymer). The display 330 may be joined onto one surface of the first supporting member 332, and the printed circuit board 340 may be joined onto the opposite surface of the first supporting member 332. A processor, memory, and/or interface may be mounted on the printed circuit board 340. The processor may include one or more of, e.g., a central processing unit, an application processor, a graphic processing device, an image signal processing, a sensor hub processor, or a communication processor.

According to an embodiment, the memory may include, e.g., a volatile or non-volatile memory.

According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

The battery 350 may be a device for supplying power to at least one component of the electronic device 101. The battery 350 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101.

According to an embodiment, the antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. For example, the antenna 370 may include a coil for wireless charging. According to an embodiment, an antenna structure may be formed by a portion or combination of the side bezel structure 331 and/or the first supporting member 332.

Figure 5:
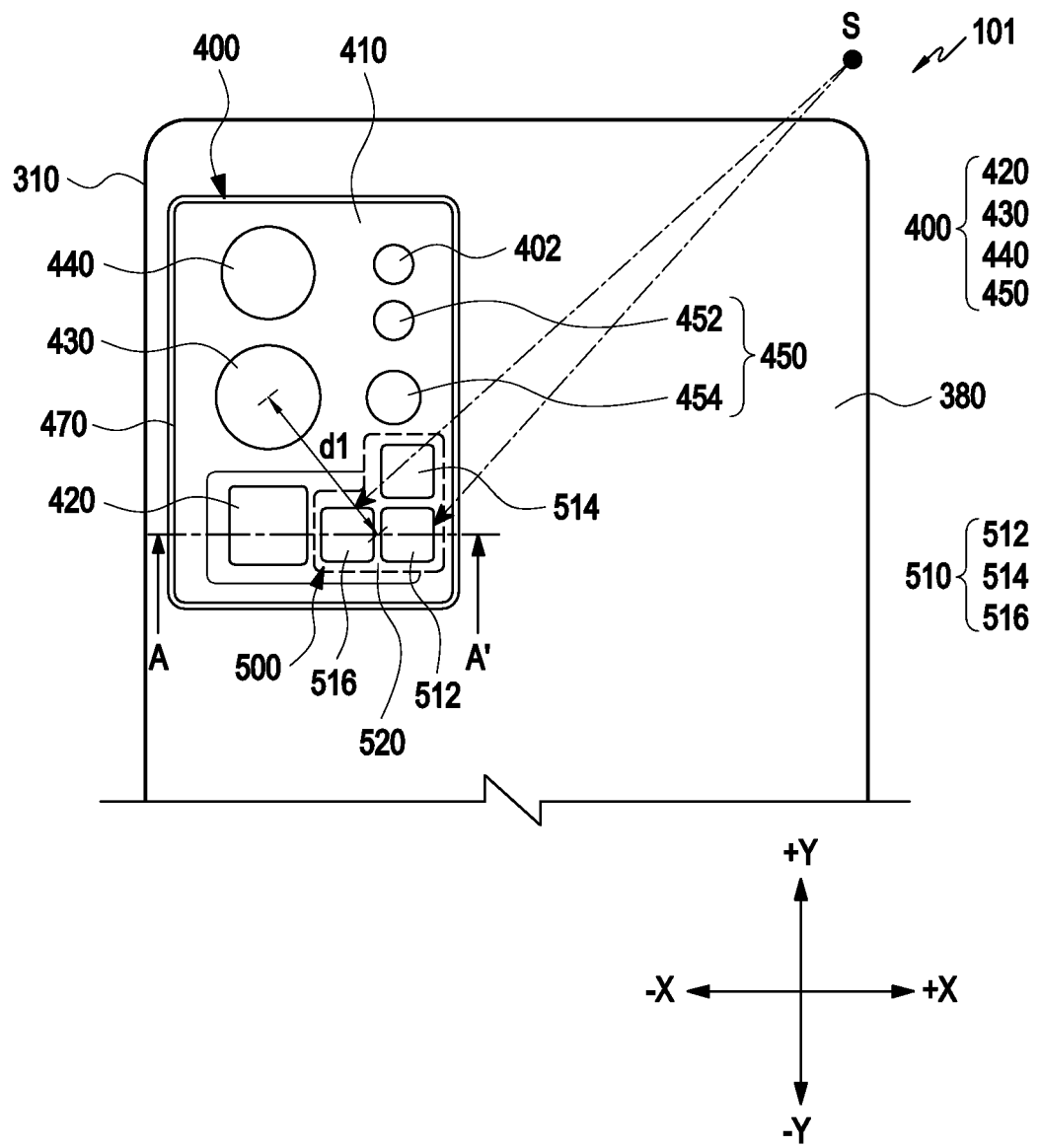
FIG. 5 is a rear view illustrating an electronic device according to various embodiments of the disclosure.
Figure 6:
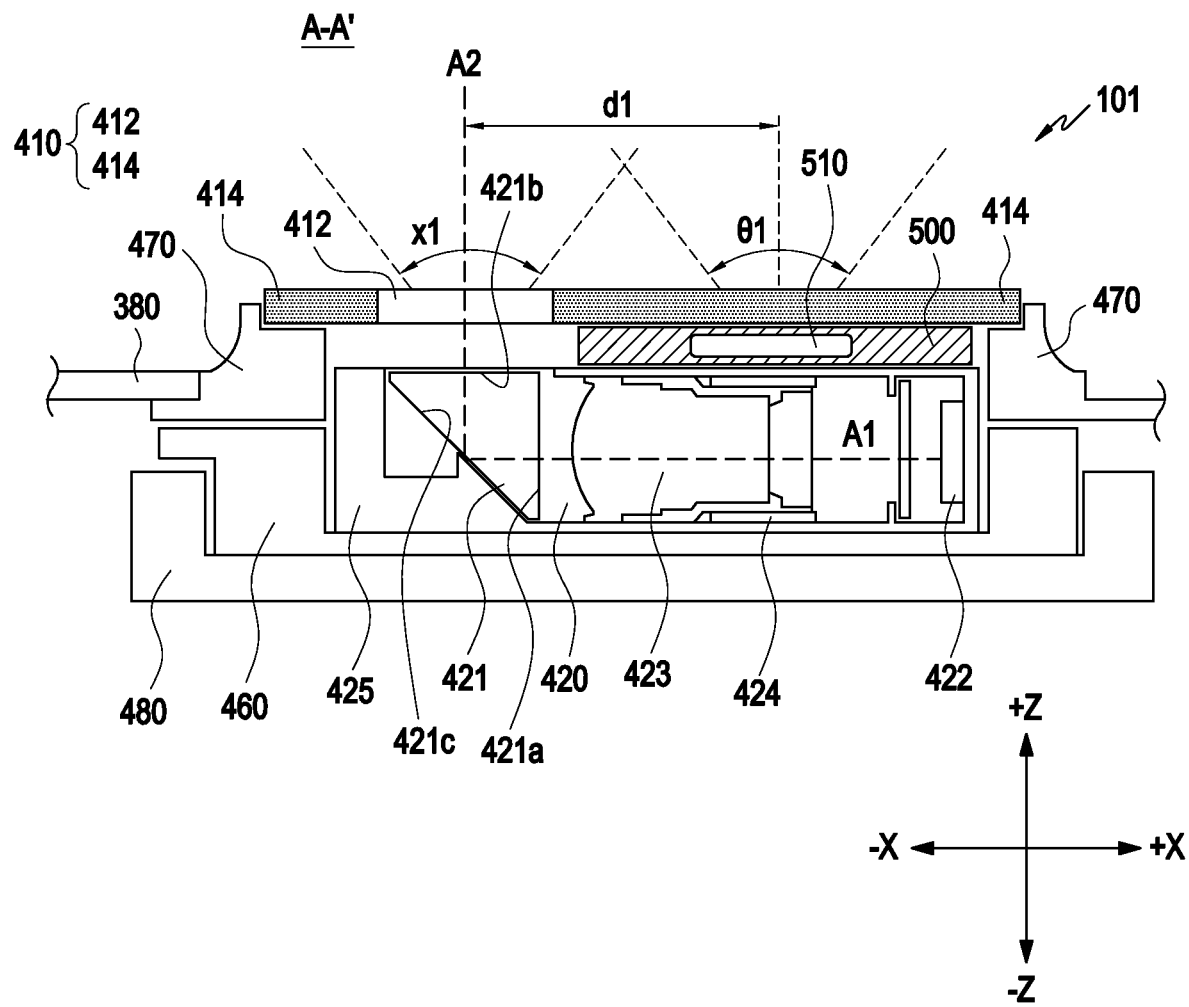
FIG. 6 is a cross-sectional view taken along line A-A' of FIG. 5.
Figure 7:
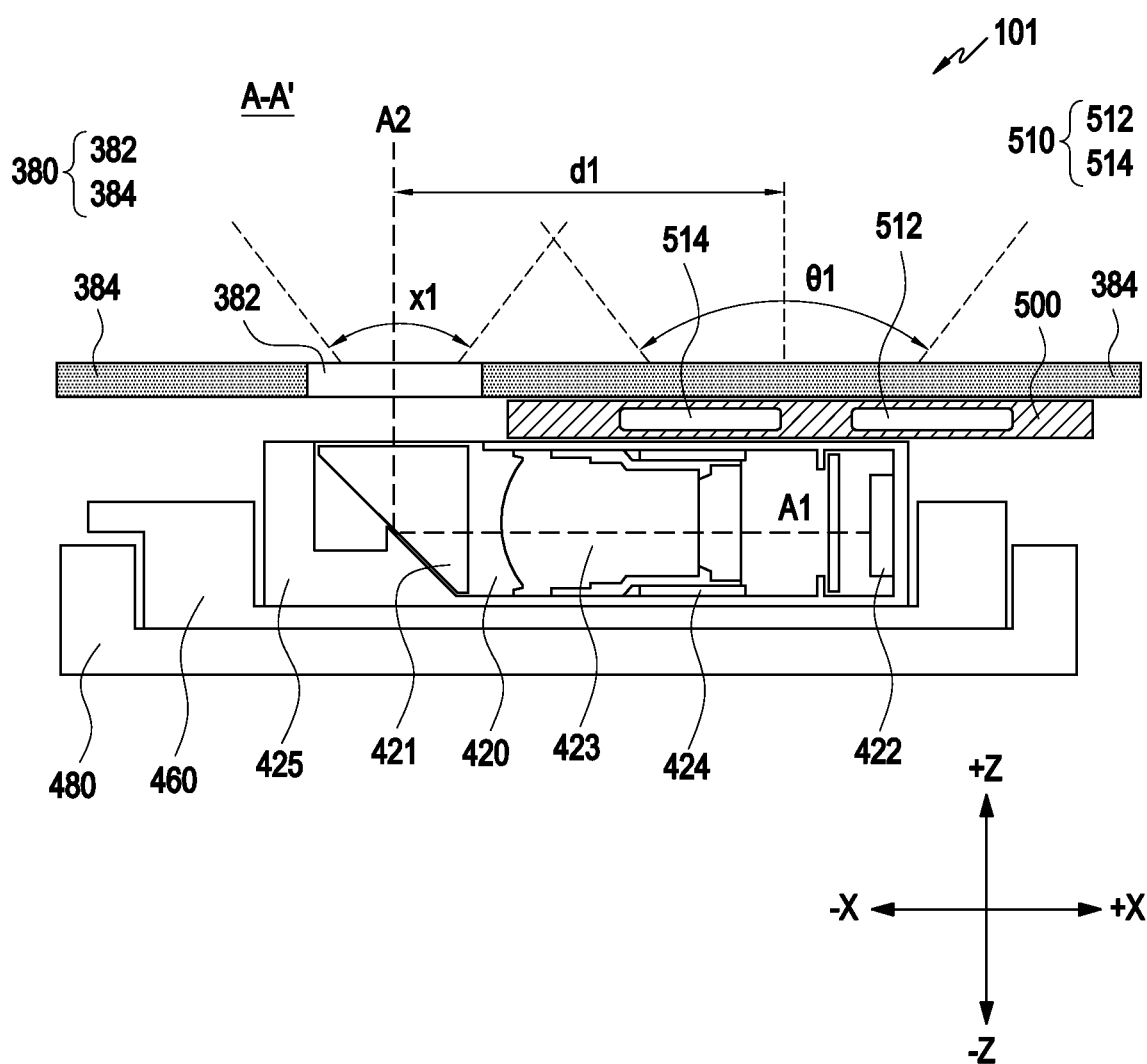
FIG. 7 is a cross-sectional view according to another embodiment of FIG. 5.

FIG. 5 is a rear view illustrating an electronic device according to various embodiments of the disclosure. FIG. 6 is a cross-sectional view taken along line A-A' of FIG. 5. FIG. 7 is a cross-sectional view according to another embodiment of FIG. 5.

Referring to FIGS. 5, 6, and 7, an electronic device may include a camera module 400 and an antenna module 500. The configuration of the camera module 400 of FIGS. 5, 6, and 7 may be identical in whole or part to the configuration of the rear camera module 312 of FIG. 3.

According to various embodiments, the camera module 400 may be disposed on the rear plate 380 of the housing 310. For example, the camera module 400 may be disposed in a third direction (e.g., the third direction (+Z direction) of FIG. 6) in which at least a portion of the rear plate 380 of the electronic device 101 faces. The camera module 400 may capture an image of an outside using at least one of a first camera module 420, a second camera module 430, or a third camera module 440.

According to various embodiments, the camera module 400 may include a camera window 410 that is at least partially substantially transparent. For example, the camera window 410 may provide a path of light obtained by the camera module 400. According to an embodiment, the camera window 410 may form at least a portion of the exterior of the camera module 400.

According to various embodiments, the camera window 410 may include a substantially transparent first transparent area 412 and a printing area 414 surrounding the first transparent area 412.

According to various embodiments, the camera modules 400 may include a first camera module 420. According to an embodiment, the first camera module 420 may be formed in a folded zoom structure. For example, the first camera module 420 may include a prism capable of refracting the light obtained from the outside of the electronic device 101 and a lens assembly 423 disposed substantially perpendicular to the camera window 410. According to various embodiments, the first camera module 420 may include components capable of refracting and obtaining the light from the outside of the electronic device 101. For example, the first camera module 420 may include at least one of a prism 421 capable of refracting light, an image sensor 422 capable of obtaining an image from the outside, the lens assembly 423 for adjusting the focus of light, an actuator 424 for adjusting the magnification of the lens assembly 423 or reducing camera shake, or a first camera housing 425. According to an embodiment, the third direction (+Z direction) in which the camera window 410 of the first camera module 420 or the rear plate 380 faces may differ from the first direction (−X direction) in which the image sensor 422 and the lens assembly 423 face. For example, the third direction (+Z direction) may be a direction perpendicular to the first direction (−X direction).

According to various embodiments, the prism 421 may reflect the light obtained in the direction of the second axis A2 in the direction of the first axis A1. For example, the prism 421 may include a first prism surface 421a facing in the direction of the first axis A1, a second prism surface 421b facing in the direction of the second axis A2, and a third prism surface 421c positioned between the first prism surface 421a and the second prism surface 421b. The light incident on the second prism surface 421b may be reflected from the third prism surface 421c and transferred to the first prism surface 421a.

According to various embodiments, the lens assembly 423 and the image sensor 422 may be disposed substantially perpendicular to the camera window 410 or the rear plate 380. For example, the lens assembly 423 and the image sensor 422 may be disposed along the first axis A1. The camera window 410 and the rear plate 380 may be disposed along the second axis A2 substantially perpendicular to the first axis A1.

According to various embodiments, at least one of the prism 421, the image sensor 422, the lens assembly 423, or the actuator 424 may be disposed in the first camera housing 425.

According to various embodiments, the first camera module 420 may be disposed under the camera window 410. For example, when the electronic device 101 is viewed in the second direction (−Z direction), the first camera module 420 may overlap at least a portion of the camera window 410.

According to various embodiments, the camera module 400 may include a first camera supporting member 460. According to an embodiment, the first camera supporting member 460 may couple at least one of the first camera module 420, the second camera module 430, the third camera module 440 or the fourth camera module 450 to a first supporting member (e.g., the first supporting member 332 of FIG. 4) of the electronic device 101. For example, the first camera supporting member 460 may connect the first camera housing 425 to the first supporting member 332. According to an embodiment, the antenna module 500 may be disposed on the first camera supporting member 460. For example, the antenna module 500 may be disposed between the first camera supporting member 460 and the camera window 410 or the first camera supporting member 460 and the rear plate 380.

According to various embodiments, the camera module 400 may include a camera window supporting member 470. According to an embodiment, the camera window supporting member 470 may support the camera window 410. For example, the camera window supporting member 470 may surround the camera window 410 and couple the camera window 410 with the rear plate 380. In an embodiment, as shown in FIG. 7, the camera window 410 and the camera window supporting member 470 may be omitted. According to an embodiment, the camera window supporting member 470 may be a camera enclosure that surrounds at least a portion of the camera window 410.

According to various embodiments, the camera module 400 may include a second camera supporting member 480 for supporting the camera module 400. According to an embodiment, the configuration of the second camera supporting member 480 may be identical in whole or part to the configuration of the first supporting member 332. According to an embodiment, the second camera supporting member 480 may extend from a side surface (e.g., the side surface 310C of FIG. 2) of the housing (e.g., the housing 310 of FIG. 2) and couple to the first camera supporting member 460.

According to various embodiments, the camera module 400 may include at least one vertical camera. The vertical camera may be a camera including an image sensor facing in the direction of the second axis A2. For example, the camera module 400 may include at least one of a second camera module 430 which is a vertical camera, a third camera module 440, or a fourth camera module 450. According to an embodiment, the second camera module 430 and the third camera module 440 may be wide-angle cameras. For example, the angle of view of the second camera module 430 and the angle of view of the third camera module 440 may be larger than the angle of view of the first camera module 420. According to an embodiment, the fourth camera module 450 may be a depth camera. For example, the fourth camera module 450 may include a light emitting unit 452 capable of emitting light (e.g., infrared light) and a light receiving unit 454 capable of receiving the light. The processor (e.g., the processor 120 of FIG. 1) may determine depth information based on the reception time of the light obtained through the fourth camera module 450. According to an embodiment, the camera module 400 may provide light to the outside of the electronic device 101 by using the flash 402.

According to various embodiments, the antenna module 500 may measure the position of the external object S. For example, the antenna module 500 may include at least one patch antenna 510 capable of resonating in a frequency band of about 3 GHz to 10 GHz. The patch antenna 510 may receive signals from another electronic device within a range of a first angle θ1. The range of the first angle θ1 may be an angle range in which the antenna module 500 may transmit or receive an RF signal. For example, the first angle θ1 may be a range of an angle of arrival (AOA) of the antenna module 500. According to an embodiment, a direction configured to transmit or receive a signal of the antenna module 500 may be substantially the same direction (e.g., +Z direction) as a direction configured to capture an image by the camera module 400.

According to various embodiments, a plurality of patch antennas 510 may be formed. For example, the patch antenna 510 may include a first patch antenna 512 and a second patch antenna 514 spaced apart from the first patch antenna 512. The second patch antenna 514 may be disposed on substantially the same plane (e.g., XY plane) as the first patch antenna 512. According to an embodiment, the first patch antenna 512 may be spaced apart from the second patch antenna 514 by a designated distance. A distance between the first feed of the first patch antenna 512 and the second feed of the second patch antenna 514 may be less than or equal to a half-wavelength (λ/2) distance of the radio frequency (RF) signal. For example, the distance between the first feed (e.g., the first feed 512a of FIG. 13) of the first patch antenna 512 and the second feed (e.g., the second feed of FIG. 13) of the second patch antenna 514 may be about 10 mm to 30 mm, but is not limited thereto. According to an embodiment, as the first patch antenna 512, the second patch antenna 514, and/or the third patch antenna 516 are spaced apart by a designated distance, isolation may be secured between the first patch antenna 512, the second patch antenna 514, and/or the third patch antenna 516 of the electronic device 101.

According to various embodiments, at least a portion of the antenna module 500 may be disposed on the first camera module 420. According to an embodiment, at least a portion of the antenna module 500 may be disposed between the camera window 410 and the first camera housing 425 of the first camera module 420. For example, the antenna module 500 may be disposed between the printing area 414 and the first camera housing 425. According to another embodiment, at least a portion of the antenna module 500 may be disposed between the first camera housing 425 of the first camera module 420 and the rear plate 380. For example, the rear plate 380 may include a first rear plate 382, which is substantially transparent, and a printed second rear plate 384. The antenna module 500 may be disposed under the second rear plate 384.

According to various embodiments, the antenna module 500 may be disposed adjacent to the camera module 400 to reduce the difference between the angle of view (e.g., first angle of view x1) of the camera module 400 and the first angle θ1 range of the antenna module 500. For example, the camera module 400 and the antenna module 500 may be disposed within a first distance d1. The first distance d1 may be a distance that does not cause an error between the angle of view of the camera module 400 and the angle of arrival of the antenna module 500. According to an embodiment, the camera module (e.g., the second camera module 430 of FIG. 5) having the largest angle of view range, of the camera module 400, may be disposed within the first distance d1 from the antenna module 500. According to another embodiment, the first camera module 420 may be disposed within the first distance d1 from the antenna module 500. According to another embodiment, the antenna module 500 may be spaced apart from the camera module (e.g., the second camera module 430 of FIG. 2) having the largest angle of view range, of the camera module 400, by more than the first distance d1.

According to various embodiments, the processor (e.g., the processor 120 of FIG. 1) may compensate for the angle of arrival of the signal (e.g., ranging response message) arriving at the antenna module 500 from the external electronic device, considering the spacing between the antenna module 500 and the camera module 400. According to an embodiment, when the antenna module 500 is positioned apart from the camera module 400 by more than the first distance d1, the processor 120 may compensate for the angle of arrival of the signal (e.g., ranging response message) arriving at the antenna module 500 from the external electronic device using a first compensation value. For example, the processor 120 may estimate at least one of the phase difference of the signal received by the antenna module 500 or the arrival distance of the signal by reflecting the first compensation value and determine the angle of arrival corresponding to the external electronic device based on at least one of the estimated signal phase difference or the estimated signal arrival distance. According to an embodiment, when the antenna module 500 is positioned within the first distance d1 from the camera module 400, the processor 120 may determine the angle of arrival of the signal arriving at the antenna module 500 from the external electronic device without compensation. According to an embodiment, when the antenna module 500 is positioned within the first distance d1 from the camera module 400, the processor 120 may compensate for the angle of arrival of the signal arriving at the antenna module 500 from the external electronic device using a second compensation value different from the first compensation value. The first compensation value may be larger than the second compensation value.

Figure 8:
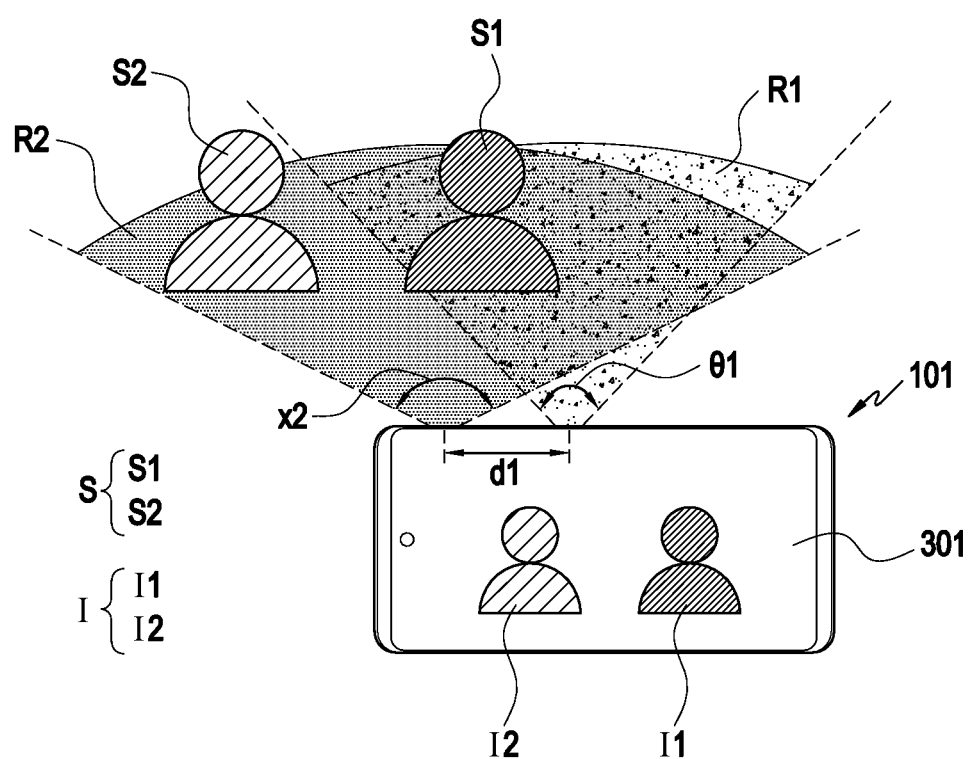
FIG. 8 is a view illustrating operations of an electronic device according to various embodiments of the disclosure.
Figure 9:
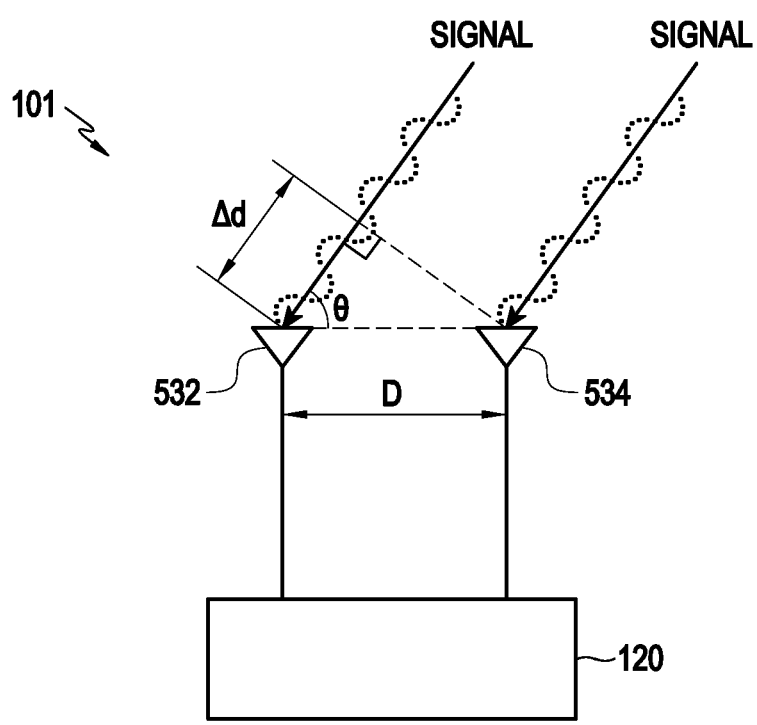
FIG. 9 is a view illustrating an angle of arrival of an antenna module according to various embodiments of the disclosure.

FIG. 8 is a view illustrating operations of an electronic device according to various embodiments of the disclosure. FIG. 9 is a view illustrating an angle of arrival of an antenna module according to various embodiments of the disclosure.

Referring to FIGS. 8 and 9, the electronic device 101 may obtain an image I of an external object S through the camera module (e.g., the camera module 400 of FIG. 5) and obtain the position of the external electronic device (e.g., the external electronic device 102 of FIG. 1) possessed by the external object S through the antenna module (e.g., the antenna module 500 of FIG. 5).

According to various embodiments, the electronic device 101 may measure the position of another electronic device positioned within the angle of arrival range R1 using an antenna (e.g., the antenna module 500 of FIG. 5) capable of detecting signals in the first angle θ1 range. For example, the processor (e.g., the processor 120 of FIG. 1) may measure the angle of arrival using a first antenna 532 and a second antenna 534 capable of receiving or transmitting ranging signals. As another example, the processor 120 may measure the distance between the electronic device 101 and the external electronic device (e.g., the external electronic device 102 of FIG. 1) possessed by the external object S using a single sided-two way ranging (SS-TWR) scheme or a double sided-two way ranging (DS-TWR) scheme. According to an embodiment, the ranging signal may include at least one of a ranging request message, a ranging response message, or a ranging control message. The ranging signal, the SS-TWR scheme, and the DS-TWR scheme are described below in detail with reference to FIG. 17. The ranging control message may be a ranging signal for activating the patch antennas of the combination corresponding to the mounting mode of the electronic device 101 based on the measurement value regarding the angle of the electronic device 101.

According to an embodiment, the angle of arrival θ forming the first angle θ1 range may be derived by Equation 1, Equation 2, and Equation 3 below. According to another embodiment, the processor 120 may determine the difference Δd between the arrival distances of the signals transferred from the transmitting device of the external electronic device 102 to the plurality of antennas based on the signal phase difference Δφ and derive the angle of arrival θ based on the determined difference Δd between the arrival distances of the signals transferred from the transmitting device of the external electronic device 102 to the plurality of antennas. In Equation 1, D may be the distance between the plurality of antennas (e.g., the first antenna 532 and the second antenna 534), and Δd may be the difference between the arrival distances of the signals transferred from the transmitting device of the external electronic device (e.g., the electronic device 102 of FIG. 1) to the plurality of antennas (e.g., the first antenna 532 and the second antenna 534). In Equation 2, Δφ may be the signal phase difference, and λ may be the length of the wavelength of the signal.

$$D = \Delta d \cdot \cos\theta \quad \text{[Equation 1]}$$

$$\Delta\phi = \frac{2\pi}{\lambda}\Delta d \quad \text{[Equation 2]}$$

$$\text{arrival of angle } (\theta) = \cos^{-1}\frac{\Delta\Phi}{2\pi D/\lambda} \quad \text{[Equation 3]}$$

According to various embodiments, the distance between the first antenna 532 and the second antenna 534 may be not more than the half-wavelength distance of the radio frequency (RF) signal of the antenna module 500 to correspond to the frequency band of the antenna module (e.g., the antenna module 500 of FIG. 5). The configuration of the first antenna 532 and the second antenna 534 may be identical in whole or part to the configuration of the first patch antenna 512 and the second patch antenna 514 of FIG. 7.

According to various embodiments, the electronic device 101 may capture the object S positioned within the camera angle of view range R2 using a wide-angle camera (e.g., the second camera module 430 or the third camera module 440 of FIG. 5) capable of detecting the image in the second angle of view x2 range and output the image I of the object S through the display 301. For example, the electronic device 101 may output a first image I1 of a first object S1 and a second image I2 of a second object S2. According to an embodiment, the second angle of view x2 range may be larger than or equal to the first angle of view x1 range. For example, the camera angle of view range of the second camera module 430 or the third camera module 440 may be larger than or equal to the camera angle of view range of the first camera module 420.

According to various embodiments, when the first distance d1 between the antenna (e.g., the antenna module 500 of FIG. 5) and the camera (e.g., the camera module 400 of FIG. 5) is a predetermined distance or more, the position of at least some of the electronic devices possessed by the external object S positioned within the camera angle of view range R2 may not be measured. For example, the antenna module 500 may detect the signal of the electronic device reflecting the position of the first external object S1 positioned within the angle of arrival range R1 but may not detect the signal of the electronic device reflecting the position of the second external object S2 positioned out of the angle of arrival range R1. The first distance d1 may be the distance between the camera module 400 and the antenna module 500.

FIGS. 10A, 10B, 10C, and 10D are front views illustrating a camera module and an antenna module of an electronic device according to various embodiments of the disclosure. FIG. 11 is a cross-sectional view taken along line B-B' of FIG. 10B.

Referring to FIGS. 10A, 10B, 10C, 10D, and 11, the camera module 400 and the antenna module 500 may be disposed in various ways. The configuration of the camera module 400 and the antenna module 500 of FIGS. 10A, 10B, 10C, 10D and/or 11 may be identical in whole or part to the configuration of the camera module 400 and the antenna module 500 of FIGS. 5 to 7.

According to various embodiments, the camera module 400 and the antenna module 500 may be disposed under the camera window 410. According to an embodiment, the first camera module 420, the second camera module 430, the third camera module 440, and the antenna module 500 may be disposed under the camera window 410. According to another embodiment, a portion of the first camera module 420, the second camera module 430, the third camera module 440, or the antenna module 500 may be disposed under the camera window 410. For example, one (e.g., the first camera module 420) of the first camera module 420, the second camera module 430, and the third camera module 440 may be disposed under the camera window 410, and another camera module (e.g., the second camera module 430 and the third camera module 440) and the antenna module 500 may be disposed under the rear plate 380. According to another embodiment, the camera window 410 may be omitted. For example, referring to FIG. 10A, the first camera module 420, the second camera module 430, the third camera module 440, and the antenna module 500 may be disposed under the rear plate 380.

According to various embodiments, the first camera module 420, the second camera module 430, and the third camera module 440 may be disposed in various ways. According to an embodiment, the first camera module 420, the second camera module 430, and the third camera module 440 may be disposed in substantially the same direction (e.g., the +Y direction). According to another embodiment, the first camera module 420 and the second camera module 430 may be disposed in different directions from the third camera module 440. For example, the second camera module 430, the third camera module 440, and the first camera module 420 may be disposed in a substantially "⌐" shape.

According to various embodiments, the antenna module 500 may include a plurality of patch antennas 510. For example, the antenna module 500 may include a first patch antenna 512, a second patch antenna 514, and a third patch antenna 516. According to an embodiment, the second patch antenna 514 and the third patch antenna 516 may be disposed to be spaced apart from the first patch antenna 512. The second patch antenna 514 and the third patch antenna 516 may be disposed in a direction substantially perpendicular with respect to the first patch antenna 512. For example, the first patch antenna 512, the second patch antenna 514, and the third patch antenna 516 may be disposed in a substantially "L" shape.

Figure 10A:
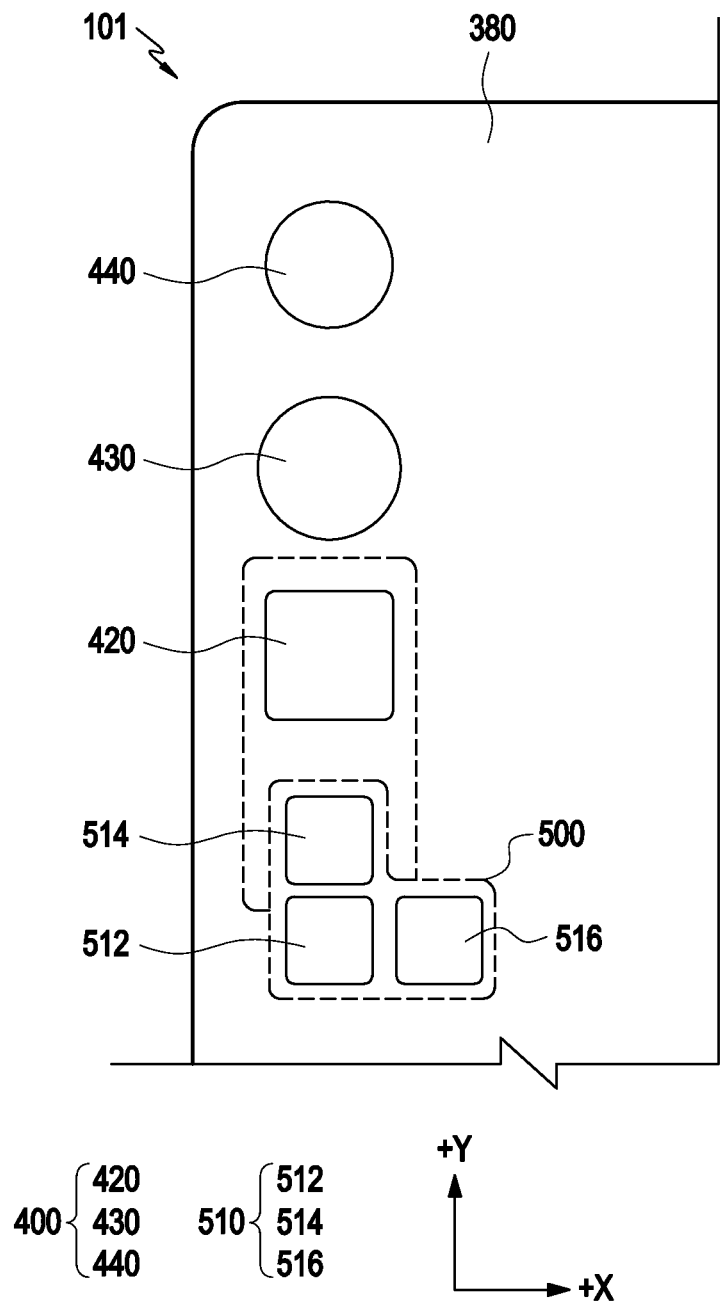
FIGS. 10A, 10B, 10C, and 10D are front views illustrating a camera module and an antenna module of an electronic device according to various embodiments of the disclosure.
Figure 11:
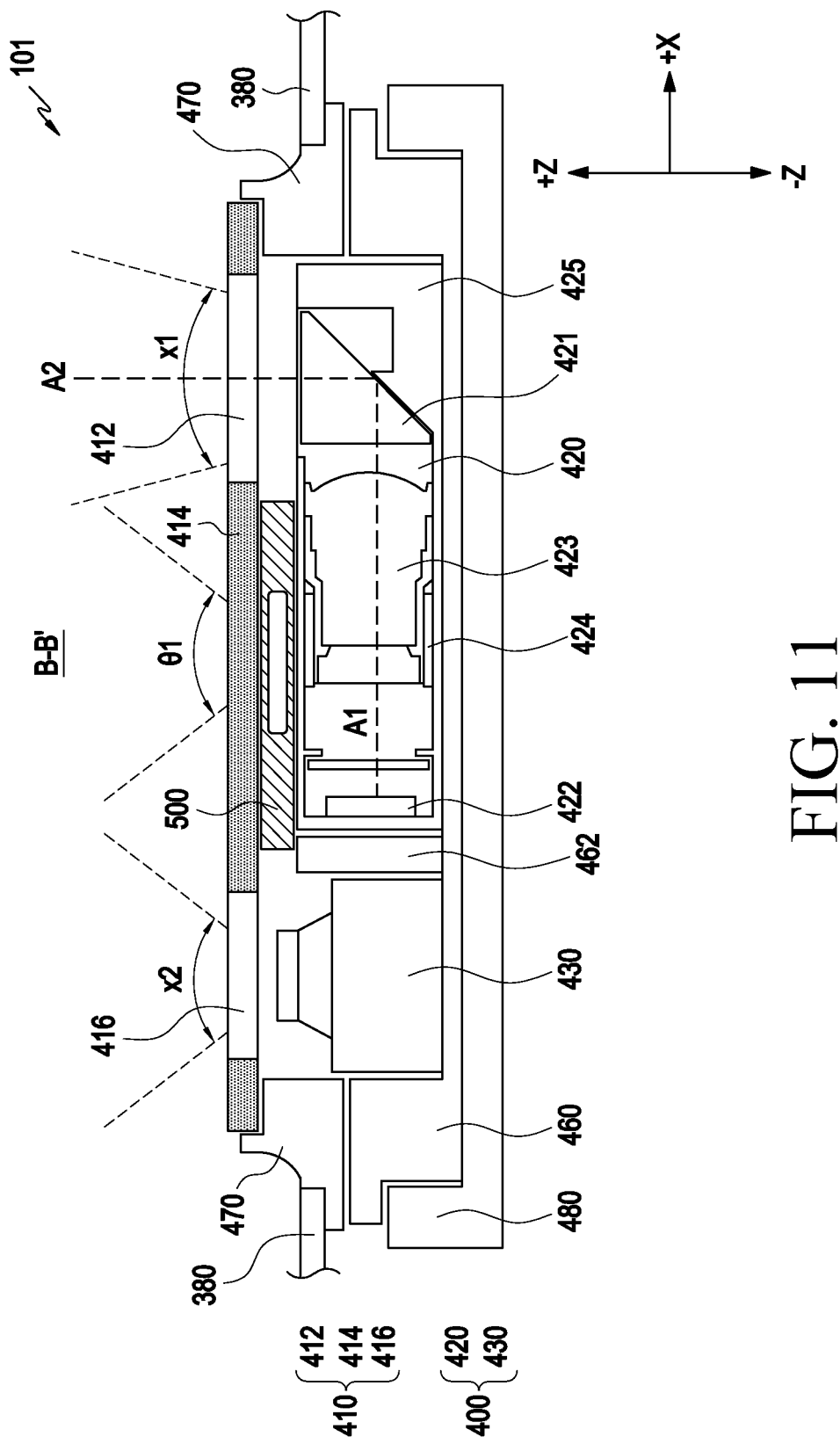
FIG. 11 is a cross-sectional view taken along line B-B' of FIG. 10B.

Referring to FIG. 10A, the antenna module 500 may be disposed between the rear plate 380 and the first camera module 420. For example, when the antenna module 500 is viewed from thereabove (e.g., in the +Z direction), at least a portion of the antenna module 500 may overlap at least a portion of the first camera module 420. According to an embodiment, the antenna module 500 may be disposed in a fourth direction (-Y direction) with respect to the first camera module 420.

Figure 10B:
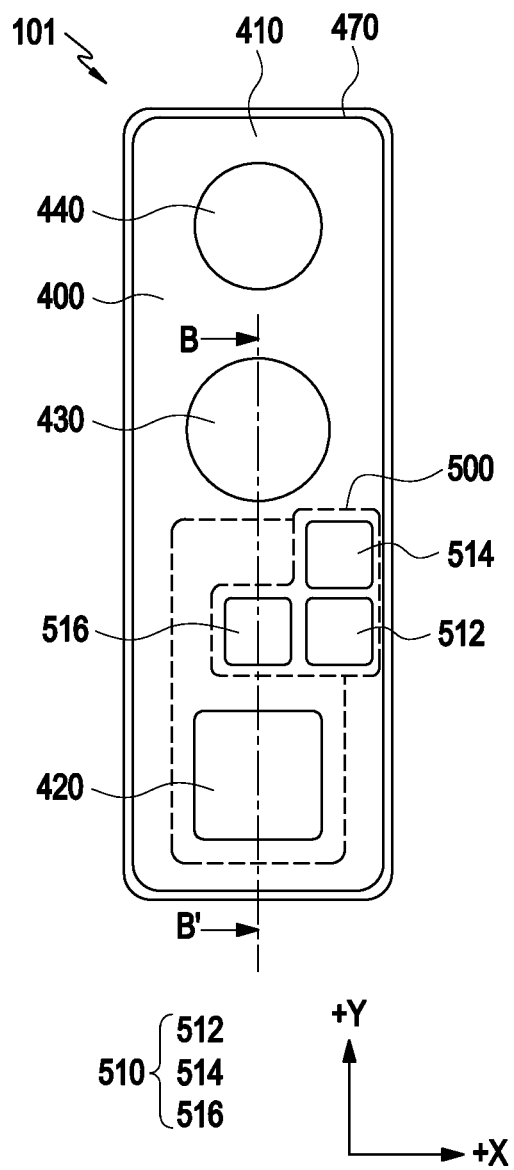

Referring to FIGS. 10B and 11, the camera module 400 may include a camera window 410, a first camera module 420, a second camera module 430, and an antenna module 500.

According to various embodiments, the camera window 410 may include at least one substantially transparent area for providing light to the camera module 400. For example, the camera window 410 may include a first transparent area 412 for providing light to the image sensor 422 of the first camera module 420, a second transparent area 416 for transferring light to the second camera module 430, and a printing area 414 surrounding the first transparent area 412 and the second transparent area 416.

According to various embodiments, the first camera module 420 and the second camera module 430 may be disposed to be spaced apart by a barrier rib 462 of the first camera supporting member 460.

According to various embodiments, the range of the second angle of view x2 of the second camera module 430 may be larger than the range of the first angle of view x1 of the first camera module 420. For example, the second camera module 430 may capture an image within a range of about 120 degrees to 180 degrees, and the first camera module 420 may capture an image within a range of about 20 degrees to about 80 degrees.

According to various embodiments, the antenna module 500 may be disposed under the printing area 414 positioned between the first transparent area 412 and the second transparent area 416. According to an embodiment, the antenna module 500 may be disposed adjacent to the camera module (e.g., the second camera module 430) having the broadest range of angle of view of the camera module 400, and the second angle of view x2 of the second camera module 430 may be included in the first angle θ1 of the antenna module 500.

Figure 10C:
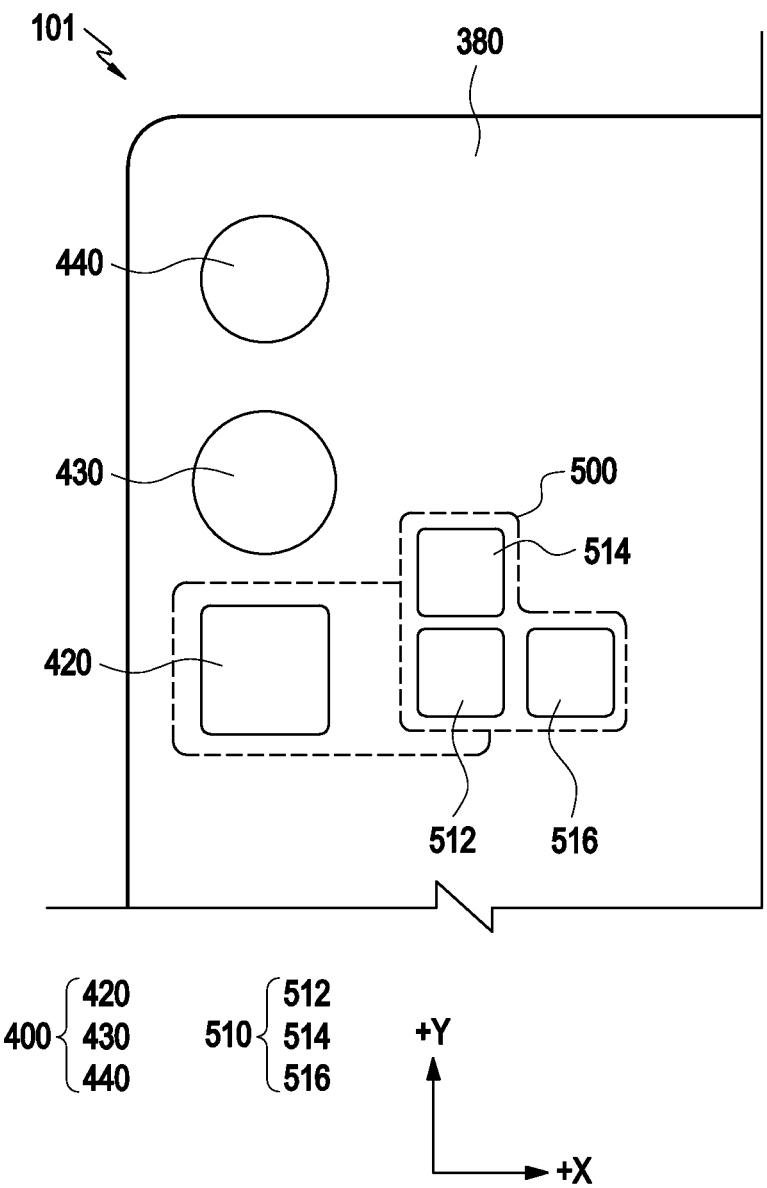

Referring to FIG. 10C, the antenna module 500 may be disposed in a position spaced apart from the first transparent area 412, providing light to the first camera module 420, in the fifth direction (+X direction). According to an embodiment, the antenna module 500 may be disposed between the rear plate 380 and the first camera module 420. For example, the first camera housing 425 may be disposed in the fifth direction (+X direction) with respect to the first transparent area 412. The antenna module 500 may be disposed between the first camera housing 425 and the rear plate 380. According to another embodiment, the antenna module 500 may be disposed under the rear plate 380 (e.g., −Z direction). For example, the antenna module 500 may be disposed between the rear plate 380 and the first supporting member (e.g., the first supporting member 332 of FIG. 4).

Figure 10D:
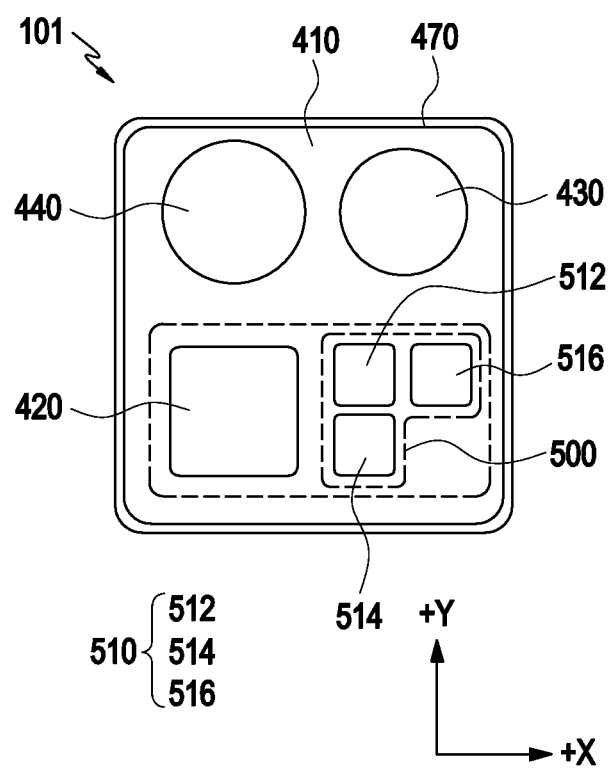

Referring to FIG. 10D, the antenna module 500 may be disposed between the camera window 410 and the first camera module 420 in a position spaced apart from the first transparent area 412, providing light to the first camera module 420, in the fifth direction (+X direction). For example, the first camera housing 425 may be disposed in the fifth direction (+X direction) with respect to the first transparent area 412. The antenna module 500 may be disposed between the camera window 410 and the first camera housing 425. According to an embodiment, the antenna module 500 may be disposed adjacent to the second camera module 430, so that the range in which the signal of the antenna module 500 arrives may include a range in which the second camera module 430 may capture.

Figure 12:
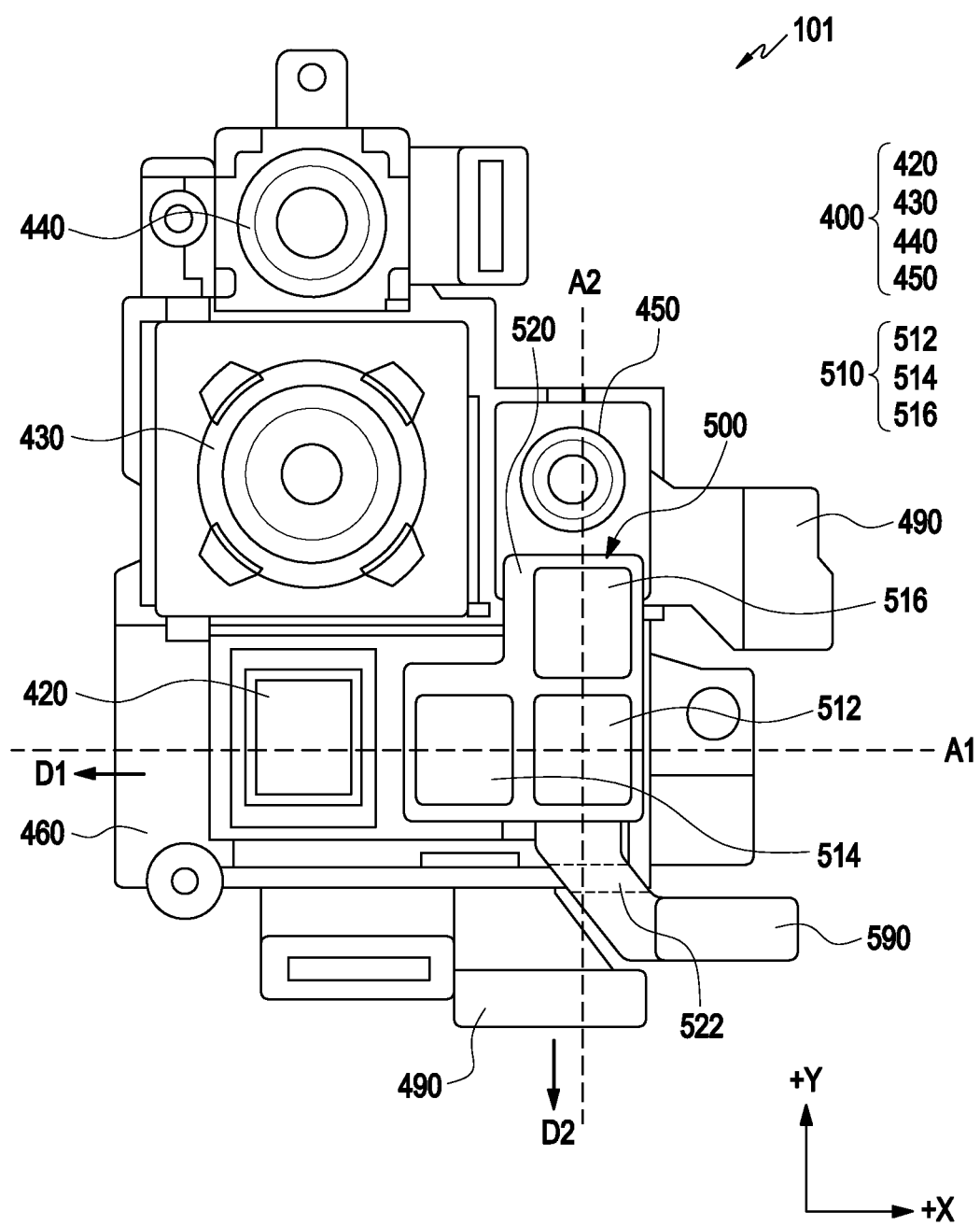
FIG. 12 is a see-through view to an inside of an electronic device through a rear surface of the electronic device according to various embodiments of the disclosure.
Figure 13:
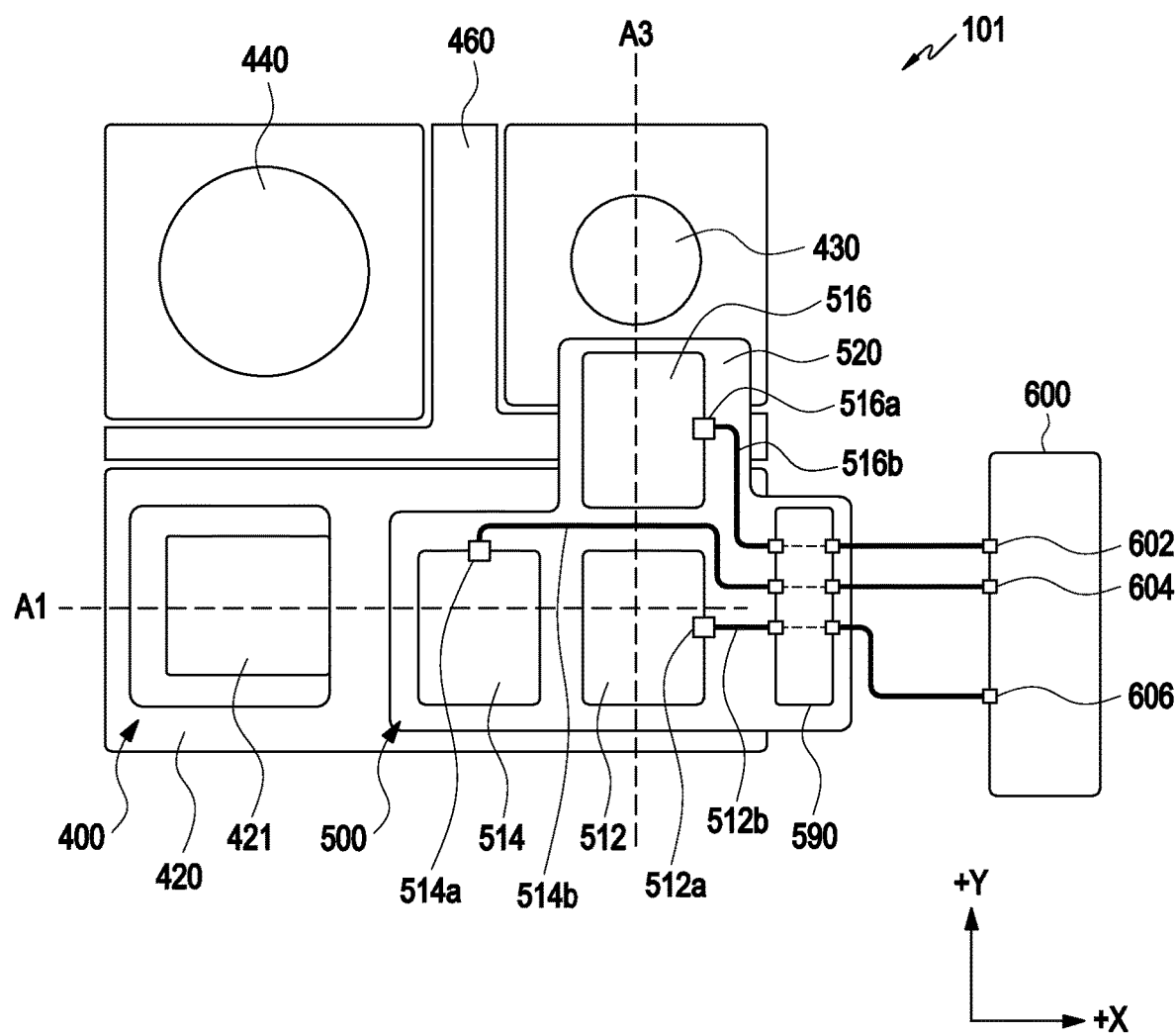
FIG. 13 is a view schematically illustrating a connection state of an antenna module and a processor according to various embodiments of the disclosure.
Figure 14:
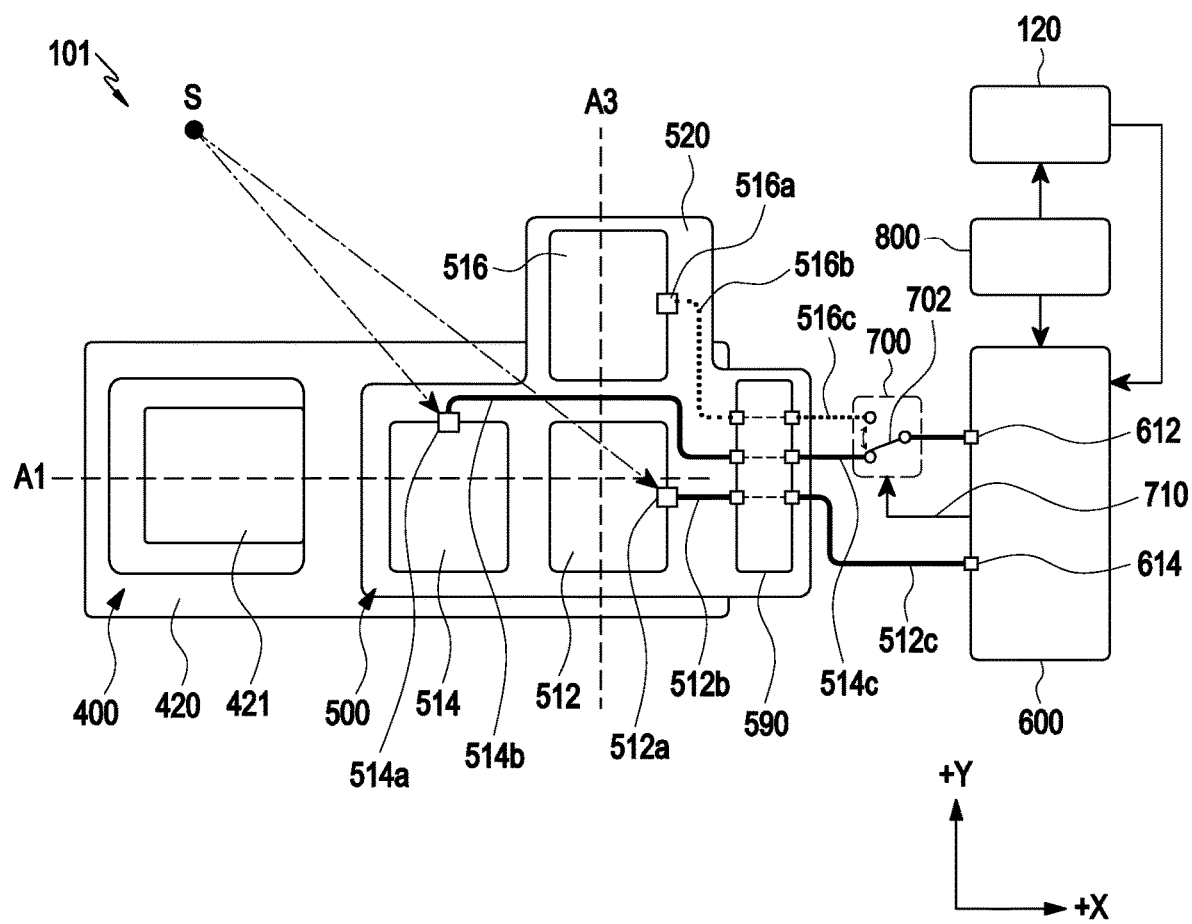
FIG. 14 is a view schematically illustrating a connection state of an antenna module and a processor in a first mounting mode according to various embodiments of the disclosure.
Figure 15:
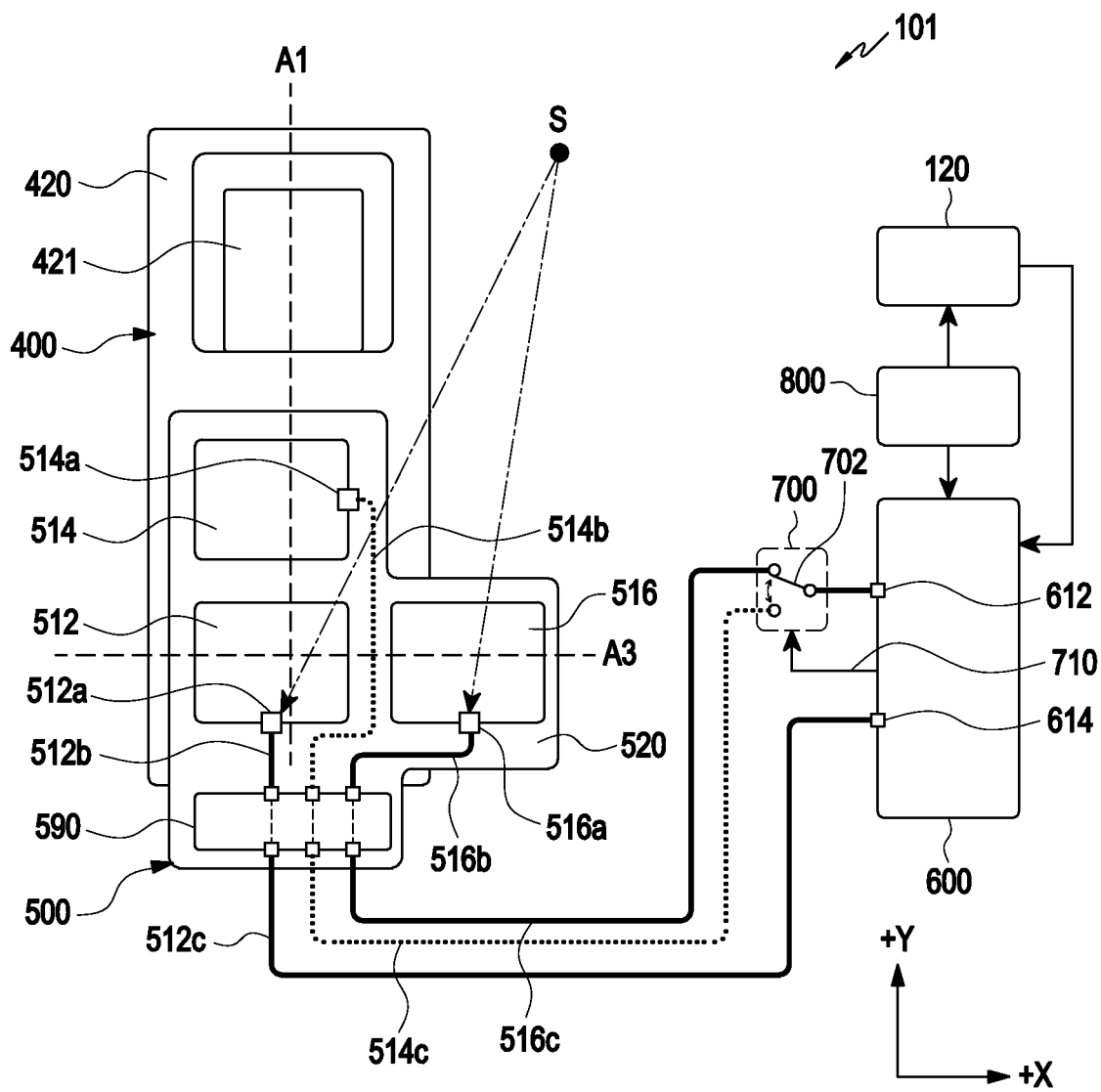
FIG. 15 is a view schematically illustrating a connection state of an antenna module and a processor in a second mounting mode according to various embodiments of the disclosure.

FIG. 12 is a see-through view to an inside of an electronic device through a rear surface of the electronic device according to various embodiments of the disclosure. FIG. 13 is a view schematically illustrating a connection state of an antenna module and a processor according to various embodiments of the disclosure. FIG. 14 is a view schematically illustrating a connection state of an antenna module and a processor in a first mounting mode according to various embodiments of the disclosure. FIG. 15 is a view schematically illustrating a connection state of an antenna module and a processor in a second mounting mode according to various embodiments of the disclosure.

Referring to FIG. 12, the electronic device 101 may include a camera module 400 and an antenna module 500 including a plurality of patch antennas 510. The configuration of the camera module 400 and the antenna module 500 of FIG. 12 may be identical in whole or part to the configuration of the camera module 400 and the antenna module 500 of FIGS. 5 to 7.

According to various embodiments, the camera module 400 may include at least one camera connecting terminal 490. According to an embodiment, the camera connecting terminal 490 may electrically connect the camera module 400 to the processor (e.g., the processor 120 of FIG. 1).

According to various embodiments, the antenna module 500 may include an antenna connecting terminal 590. According to an embodiment, the antenna connecting terminal 590 may electrically connect the patch antenna 510 to the processor (e.g., the processor 120 of FIG. 1). According to an embodiment, the antenna module 500 may include at least one bending portion 522 that provides an electrical connection path between the antenna connecting terminal 590 and the processor 120.

According to various embodiments, the antenna connecting terminal 590 may face in substantially the same direction (e.g., +X direction) as at least one camera connecting terminal 490. For example, the camera connecting terminal 490 and the antenna connecting terminal 590 may extend in substantially the same direction to increase the ease of assembly of the camera module 400 and the antenna module 500 to the electronic device 101.

According to various embodiments, at least a portion of the antenna module 500 may be disposed to correspond to the first axis A1 formed by the first camera module 420. For example, when the antenna module 500 is viewed in the second direction (−Z direction), the antenna module 500 may overlap the first camera module 420.

According to various embodiments, the patch antenna 510 may be disposed in various directions. For example, the second patch antenna 514 may be disposed to be spaced apart from the first patch antenna 512 in the first antenna direction D1. The third patch antenna 516 may be disposed to be spaced apart from the first patch antenna 512 in the second antenna direction D2. According to an embodiment, the first patch antenna direction D1 may be substantially the same as the direction of the first axis A1 of the first camera module 420, and the second patch antenna direction D2 may be substantially perpendicular to the first patch antenna direction D1.

Referring to FIGS. 12 to 15, the electronic device 101 may include a camera module 400, an antenna module 500, an antenna circuit 600, a switching circuit 700, and a sensor module 800. The configuration of the camera module 400 and the antenna module 500 of FIGS. 13 to 15 may be identical in whole or part to the configuration of the camera module 400 and the antenna module 500 of FIG. 5, and the configuration of the sensor module 800 of FIGS. 14 and 15 may be identical in whole or part to the configuration of the sensor module 176 of FIG. 1.

According to various embodiments, the signal obtained using the patch antenna 510 may be transferred to the antenna circuit 600. The antenna circuit 600 may be electrically connected to the processor 120 or a communication module (e.g., the communication module 190 of FIG. 1) and transfer the signal obtained from the antenna module 500 to the processor 120 or the communication module 190. For example, the first patch antenna 512 may be electrically connected to the antenna connecting terminal 590 through the first feed 512a and the 1-1th antenna line 512b, and the second patch antenna 514 may be electrically connected to the antenna connecting terminal 590 through the second feed 514a and the 2-1th antenna line 514b. The third patch antenna 516 may be electrically connected to the antenna connecting terminal 590 through the third feed 516a and the 3-1th antenna line 516b.

According to various embodiments, the antenna circuit 600 may be electrically connected to the antenna module 500 and control connection of the patch antennas 510 of the antenna module 500. For example, the antenna circuit 600 may include at least one communication port. The communication port may include at least one of a reception port or a transmission/reception port. For example, the antenna circuit 600 may be connected to the patch antenna 510 through a first communication port 602 and a second communication port 604, which are reception ports, and a third communication port 606, which is a third/reception port. According to an embodiment, the electronic device 101 may use any one of the first patch antenna 512, the second patch antenna 514, and/or a third patch antenna 516 as an antenna radiator to transmit and receive RF signals of a designated frequency band (e.g., ultra-wide band (UWB)) and use the rest as antenna radiators to receive RF signals of a designated frequency band. In an example, the electronic device 101 may use the antenna radiator (e.g., the first patch antenna 512) with the smallest sum of inter-feeding point distances from the other antenna radiators among the first patch antenna 512, the second patch antenna 514, and/or the third patch antenna 516 operated as antenna radiators, as the antenna radiator to transmit and receive RF signals of the designated frequency band.

According to various embodiments, the switching circuit 700 may be electrically connected with the patch antenna 510 and the antenna circuit 600. According to an embodiment, the switching circuit 700 may include a switch 702 for selecting whether to operate the patch antenna 510. For example, the switch 702 may electrically connect the second patch antenna 514 or the third patch antenna 516 to the antenna circuit 600 to allow the second patch antenna 514 or the third patch antenna 516 to be used to receive the ranging response signal according to the mounting mode (or rotation mode). According to an embodiment, the antenna circuit 600 may transmit the switching signal 710 for controlling the switching circuit 700 to the switching circuit 700 to change the connection state with the patch antenna 510.

According to various embodiments, the sensor module 800 may include various sensors. For example, the sensor module 800 may include at least one of a gyro sensor, an accelerometer, or a geomagnetic sensor. According to an embodiment, the sensor module 800 may detect the angle of the electronic device 101 from the ground and may transfer information reflecting the detected angle to the processor 120.

According to various embodiments, the electronic device 101 may detect the mounting mode of the electronic device 101 through the sensor module 800. According to an embodiment, the electronic device 101 may detect whether the posture of the electronic device 300 is in a portrait state (e.g., a first mounting mode of FIG. 14) or a landscape state (e.g., a second mounting mode of FIG. 15) through the sensor module 800. For example, the sensor module 800 may be a 9-axis motion sensor. The electronic device 101 may forms a virtual coordinate space based on at least one of the azimuth (or "yaw"), pitch, or roll value measured by the 9-axis motion sensor and divide an area of the coordinate space into a landscape range and another area of the coordinate space into a portrait range. The electronic device 101 may detect whether the mounting mode of the electronic device 101 is the portrait state or the landscape state, based on whether the current posture of the electronic device 101 belongs to the landscape range or the portrait range.

According to various embodiments, the patch antenna 510 used may be changed based on the mounting mode of the electronic device 101. For example, whether the second patch antenna 514 or the third patch antenna 516 is connected to the antenna circuit 600 may be changed based on the angle of the electronic device 101 from the ground (e.g., ZY plane).

According to various embodiments, the first patch antenna 512 and the second patch antenna 514 may measure the position of the external object S in the first mounting mode (e.g., FIG. 14). For example, when the antenna circuit 600 receives the information reflecting the first mounting mode from the processor 120, the antenna circuit 600 may control in a first connection state in which the switch 702 of the switching circuit 700 is connected with the 2-2th antenna line 514c and is not connected with the 3-2th antenna line 516c. According to an embodiment, in the first mounting mode, the first patch antenna 512 may be connected with the fifth communication port 614 of the antenna circuit 600, and the second patch antenna 514 may be connected with the fourth communication port 612 of the antenna circuit 600 through the switch 702. The fourth communication port 612 and the fifth communication port 614 may be at least one of a reception port or a transmission port. According to an embodiment, the first mounting mode may be defined as a state in which the first axis A1 of the first camera module 420 is positioned more adjacent to the ground (e.g., ZY plane) than the third axis A3 perpendicular to the first axis A1. According to an embodiment, the first axis A1 may be a virtual axis formed by the first patch antenna 512 and the second patch antenna 514, and the third axis A3 may be a virtual axis formed by the first patch antenna 512 and the third patch antenna 516. In the first mounting mode, the second patch antenna 514 may be electrically connected with the antenna circuit 600, and the third patch antenna 516 may not be electrically connected with the antenna circuit 600. According to an embodiment, the first mounting mode may be a state in which a longer edge among the edges of the housing (e.g., the housing 310 of FIG. 2) of the electronic device 101 which has a substantially rectangular shape is positioned in a vertical direction (e.g., Y-axis direction).

According to various embodiments, the first patch antenna 512 and the third patch antenna 516 may measure the position of the external object S in the second mounting mode (e.g., FIG. 15). For example, when the antenna circuit 600 receives the information reflecting the second mounting mode from the processor 120, the antenna circuit 600 may control the switch 702 of the switching circuit 700 to control in a second connection state in which the antenna circuit 600 is connected with the 3-2th antenna line 516c and is not connected with the 2-2th antenna line 514c. According to an embodiment, in the second mounting mode, the first patch antenna 512 may be connected with the fifth communication port 614 of the antenna circuit 600, and the third patch antenna 516 may be connected with the fourth communication port 612 of the antenna circuit 600 through the switch 702. The second mounting mode may be defined as a state in which the third axis A3 of the first camera module 420 is positioned more adjacent to the ground (e.g., ZY plane) than the first axis A1. According to an embodiment, the first axis A1 may be a virtual axis formed by the first patch antenna 512 and the second patch antenna 514, and the third axis A3 may be a virtual axis formed by the first patch antenna 512 and the third patch antenna 516. In the second mounting mode, the third patch antenna 516 may be electrically connected with the antenna circuit 600, and the second patch antenna 514 may not be electrically connected with the antenna circuit 600. According to an embodiment, the second mounting mode may be a state in which a longer edge among the edges of the housing (e.g., the housing 310 of FIG. 2) of the electronic device 101 which has a substantially rectangular shape is positioned in a horizontal direction (e.g., X-axis direction).

Figure 16A:
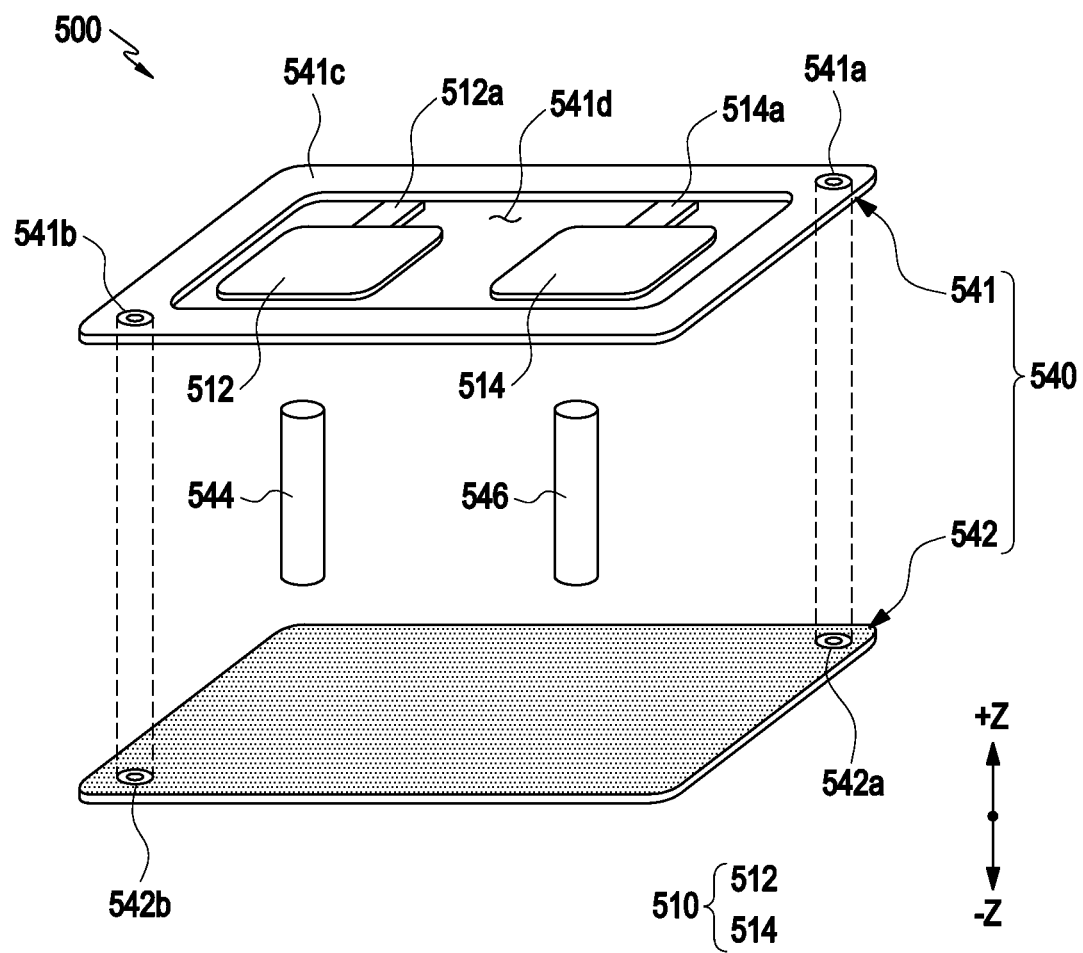
FIGS. 16A and 16B are exploded perspective views illustrating an antenna module according to various embodiments of the disclosure.
Figure 16B:
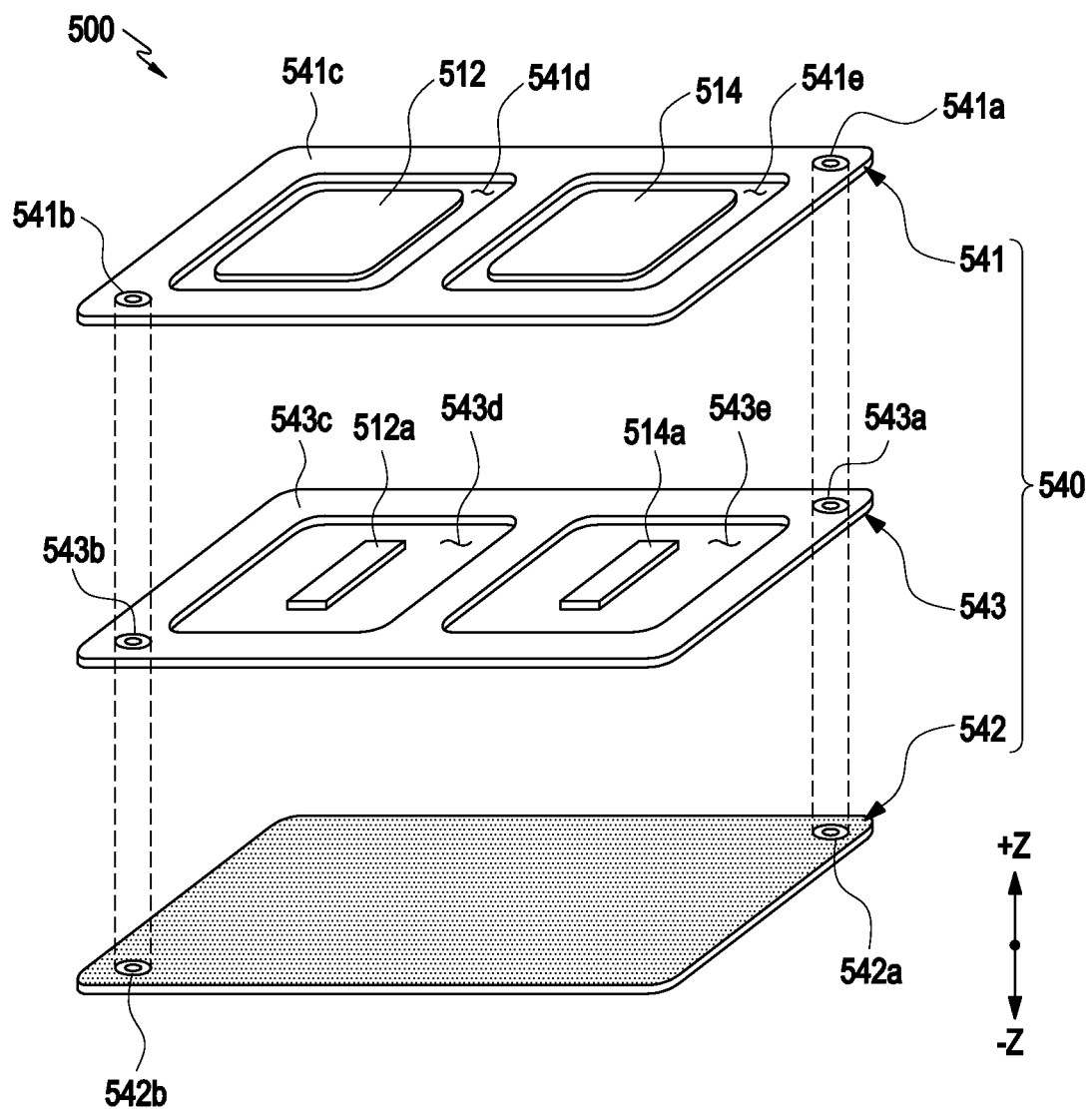

FIGS. 16A and 16B are exploded perspective views illustrating an antenna module according to various embodiments of the disclosure. The configuration of the antenna module 500 of FIGS. 16A and 16B may be identical in whole or part to the configuration of the antenna module 500 of FIG. 5.

Referring to FIG. 16A, according to an embodiment, the flexible printed circuit board 540 may include a plurality of layers. For example, the flexible printed circuit board 540 may include a first layer 541 and a second layer 542 positioned under (e.g., −Z direction) the first layer 541. The configuration of the flexible printed circuit board 540 may be identical in whole or part to the configuration of the flexible printed circuit board 520 of FIG. 5.

According to various embodiments, the flexible printed circuit board 540 may include a first patch antenna 512, a second patch antenna 514 spaced apart from the first patch antenna 512, a first feed 512a, and a second feed 514a, disposed on the first layer 541. According to an embodiment, the first patch antenna 512 may be electrically connected to a communication module (e.g., the communication module 190 of FIG. 1) through the first feed 512*a*. According to an embodiment, the second patch antenna 514 may be electrically connected to the communication module 190 through a second feed 514*a*. The position of the first feed 512*a* and/or the second feed 514*a* is not limited to the illustrated embodiment, and the position of the first feed 512*a* and/or the second feed 514*a* may be changed according to an embodiment. The flexible printed circuit board 540 may include an electrical connection member to electrically connect the first patch antenna 512 and/or the second patch antenna 514 on the first layer 541 with the ground on the second layer 542. The electrical connection member may include, e.g., a signal line, a conductive gasket, a conductive via hole, or a C-clip, but is not limited thereto. For convenience of description, two patch antennas (e.g., the first patch antenna 512 and the second patch antenna 514) have been described, but the antenna module 500 may further include two or more patch antennas (e.g., the third patch antenna 516 of FIG. 5). The position of the first feed 512*a* and/or the second feed 514*a* is not limited to the illustrated embodiment, and the position of the first feed 512*a* and/or the second feed 514*a* may be changed according to an embodiment.

According to various embodiments, the first layer 541 of the flexible printed circuit board 540 may include a first protective ground 541*c* including at least one hole 541*a*. According to an embodiment, the first protective ground 541*c* may be disposed to surround at least one of the first patch antenna 512, the second patch antenna 514, the first feed 512*a* or the second feed 514*a*. For example, at least one of the first patch antenna 512, the second patch antenna 514, the first feed 512*a*, or the second feed 514*a* may be disposed in at least one hole 541*d* of the first protective ground 541*c*. According to an embodiment, the first protective ground 541*c* may shield at least one of the first patch antenna 512, the second patch antenna 514, the first feed 512*a*, or the second feed 514*a*. For example, the first protective ground 541*c* may shield the noise generated from other electronic components in the electronic device (e.g., the electronic device 101 of FIG. 1), which is transferred to at least one of the first patch antenna 512, the second patch antenna 514, the first feed 512*a*, or the second feed 514*a*.

According to various embodiments, the flexible printed circuit board 540 may include the second layer 542 including a ground. The second layer 542 may form a capacitive coupling with the first feed 512*a* and the second feed 514*a* of the first layer 541. According to an embodiment, a dielectric having a designated permittivity may be disposed between the first layer 541 and the second layer 542 of the flexible printed circuit board 540. Depending on the thickness of the dielectric disposed between the first layer 541 and the second layer 542, the resonance characteristics of the first patch antenna 512 and the second patch antenna 514 operating as antenna radiators may be changed. For example, as the thickness of the dielectric increases, the coupling space between the first patch antenna 512 and the second patch antenna 514 and the ground of the second layer 542 may increase so that the antenna efficiency (e.g., antenna gain) of the first patch antenna 512 and the second patch antenna 514 may be enhanced.

According to various embodiments, the first layer 541 and the second layer 542 of the flexible printed circuit board 540 may be electrically connected via at least one via including a conductive material. According to an embodiment, at least one first through hole (or via hole) 541*a* and 541*b* may be formed in the first protective ground 541*c* of the first layer 541, and at least one second through hole 542*a* and 542*b* may be formed in positions corresponding to the at least one first through hole 541*a* and 541*b* of the first layer 541 of the second layer 542. The at least one via may be disposed in the at least one first through hole 541*a* and 541*b* of the first layer 541 and the at least one second through hole 542*a* and 542*b* of the second layer 542 and electrically connect the first layer 541 and the second layer 542.

According to various embodiments, a film layer may be disposed over (e.g., +Z direction) of the first layer 541 of the flexible printed circuit board 540 and/or under (e.g., -Z direction) of the second layer 542. The film layer may protect at least one of the first layer 541 or the second layer 542 of the flexible printed circuit board 540.

According to various embodiments, the flexible printed circuit board 540 may include at least one electrical connection member 544 and 546 to electrically connect the first patch antenna 512 and/or the second patch antenna 514 on the first layer 541 with the ground on the second layer 542. The electrical connection members 544 and 546 may include a first electrical connection member 544 to electrically connect the first patch antenna 512 of the first layer 541 and the ground of the second layer 542 and a second electrical connection member 546 to electrically connect the second patch antenna 514 of the first layer 541 and the ground of the second layer 542. Through the first electrical connection member 544 and/or the second electrical connection member 546, the current flow of the first patch antenna 512 and/or the second patch antenna 514 may be changed. As a result, the resonance characteristics of the first patch antenna 512 and/or the second patch antenna 514 may be changed. In an embodiment, the first electrical connection member 544 and/or the second electrical connection member 546 may mean a structure in which a plurality of conductive vias are disposed in a wall shape. In another embodiment, the first electrical connection member 544 and/or the second electrical connection member 546 may be a wall-shaped conductive via, but is not limited thereto. For example, the first electrical connection member 544 and/or the second electrical connection member 546 may include at least one of a signal line, a conductive gasket, a conductive foam, and/or a C-clip.

Referring to FIG. 16B, the flexible printed circuit board 540 may include a first layer 541, a second layer 542 disposed under (e.g., -Z direction) the first layer 541, and a third layer 543 disposed between the first layer 541 and the second layer 542. The configuration of the first patch antenna 512, the second patch antenna 514, and the first protective ground 541*c* of FIG. 16B may be identical in whole or part to the configuration of the first patch antenna 512, the second patch antenna 514, and the first protective ground 541*c* of FIG. 16A.

According to various embodiments, the first protective ground 541*c* may be disposed to surround the first patch antenna 512 and the second patch antenna 514. For example, the first patch antenna 512 may be disposed in the first hole 541*d* of the first protective ground 541*c*, and the second patch antenna 514 may be disposed in the second hole 541*e* of the first protective ground 541*c*. The first protective ground 541*c* may shield the first patch antenna 512 and the second patch antenna 514 from external noise.

According to various embodiments, the flexible printed circuit board 540 may include a first feed 512*a* and a second feed 514*a* disposed on the third layer 543. According to an embodiment, the first patch antenna 512 may be electrically connected to a communication module (e.g., the communication module 190 of FIG. 1) through the first feed 512*a*, and the second patch antenna 514 may be electrically connected to the communication module 190 through the second feed 514a. The third layer 543 of the flexible printed circuit board 540 may include at least one connection member to electrically connect at least one of the first patch antenna 512 or the second patch antenna 514 to the ground of the second layer 542.

According to various embodiments, the third layer 543 of the flexible printed circuit board 540 may include a second protective ground 543c where at least one hole 543d and 543e is formed. According to an embodiment, the second protective ground 543c may be disposed to surround the first feed 512a and the second feed 514a. For example, the first feed 512a may be disposed in the third hole 543d of the second protective ground 543c, and the second feed 514a may be disposed in the fourth hole 543e of the second protective ground 543c. The position of the first feed 512a and/or the second feed 514a is not limited to the illustrated embodiment, and the position of the first feed 512a and/or the second feed 514a may be changed according to an embodiment.

According to various embodiments, the flexible printed circuit board 540 may include the second layer 542 including a ground. The second layer 542 may form a capacitive coupling with the first feed 512a and the second feed 514a of the third layer 543.

According to various embodiments, at least one of the first layer 541, the second layer 542, or the third layer 543 of the flexible printed circuit board 540 may be electrically connected through at least one via including a conductive material. According to an embodiment, at least one first through hole 541a and 541b may be formed in the protective ground 541c of the first layer 541. According to an embodiment, at least one second through hole 542a and 542b formed in positions corresponding to the at least one first through hole 541a and 541b may be formed on the second layer 542. According to an embodiment, at least one third through hole 543a and 543b may be formed on the third layer 543 in the positions corresponding to the at least one second through hole 542a and 542b. According to an embodiment, the at least one via may be disposed in the at least one first through hole 541a and 541b, the at least one second through hole 542a and 542b, and/or the at least one third through hole 543a and 543b to electrically connect the first layer 541, the second layer 542, and/or the third layer 543.

According to various embodiments, a dielectric having a designated permittivity may be disposed between the first layer 541 and second layer 542 of the flexible printed circuit board 540 and between the second layer 542 and the third layer 543. According to an embodiment, depending on the thickness of the dielectric, the resonance characteristics of the first patch antenna 512 and the second patch antenna 514 operating as antenna radiators may be changed.

According to various embodiments, a film layer may be disposed over (e.g., +Z direction) of the first layer 541 of the flexible printed circuit board 540 and/or under (e.g., −Z direction) of the second layer 542. The film layer may protect the first layer 541, second layer 542, and/or third layer 543 of the flexible printed circuit board 540.

Figure 17:
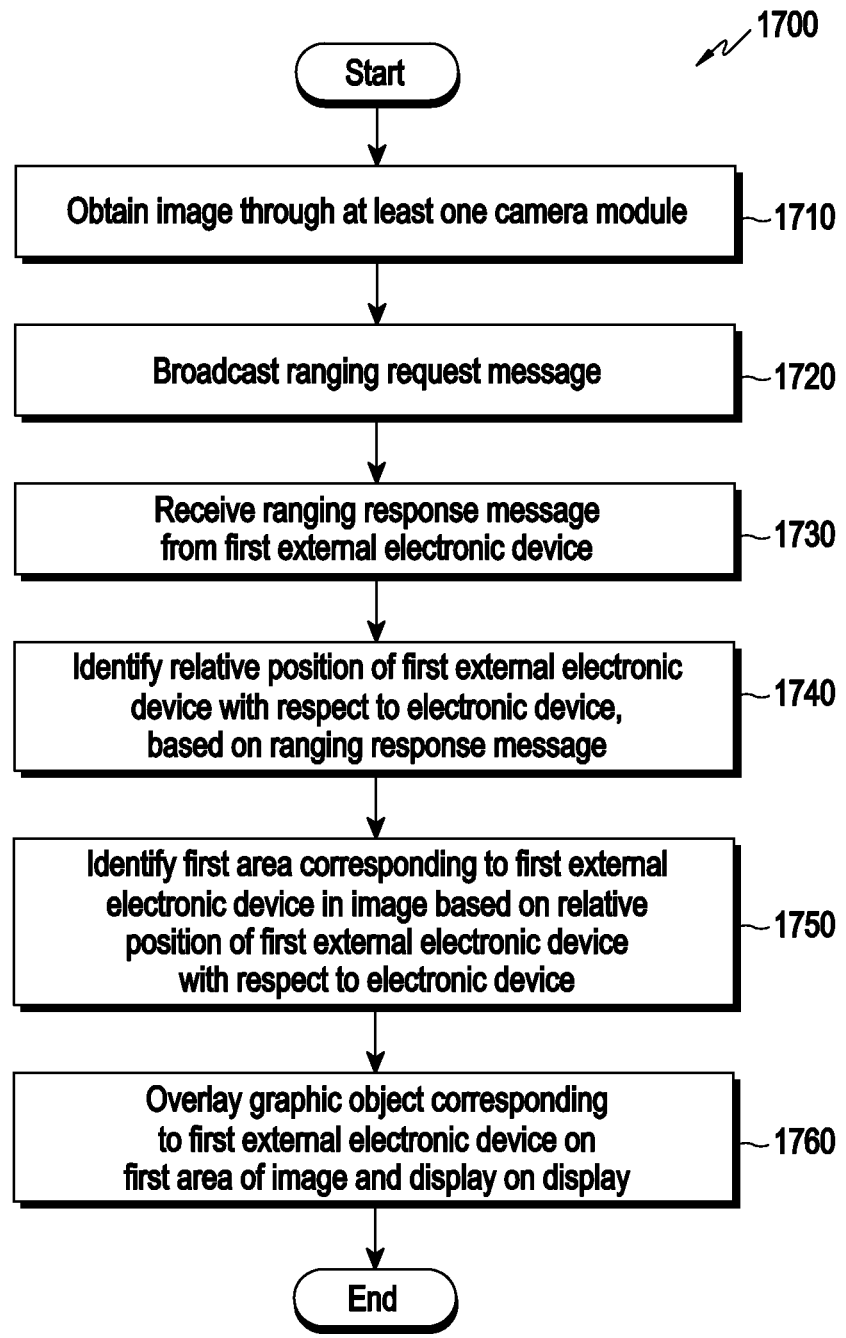
FIG. 17 is a flowchart illustrating operations performed by an electronic device according to various embodiments of the disclosure.

FIG. 17 is a flowchart 1700 illustrating operations performed by an electronic device according to various embodiments of the disclosure. In operation 1710, at least one processor (e.g., the processor 120) of the electronic device (e.g., the electronic device 101) may obtain an image through at least one camera module (e.g., the first camera module 420, the second camera module 430, the third camera module 440, and the fourth camera module 450).

According to various embodiments, each camera module constituting the at least one camera module 420, 430, 440, and 450 may be activated or deactivated according to a user input. For example, the at least one processor 120 may execute a camera interface in response to selection of an icon of a camera application. The at least one processor 120 may perform a corresponding function in response to the user's selection among various functions displayed on the execution screen of the camera application.

Figure 18:
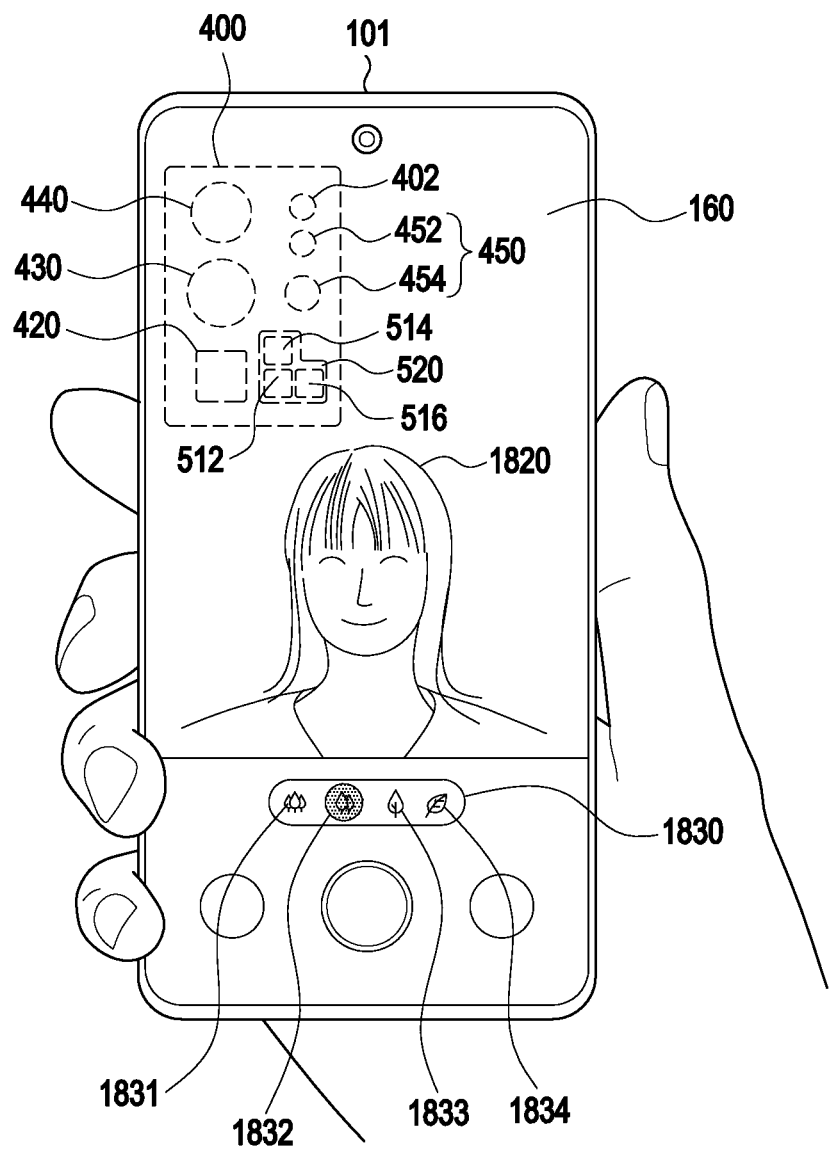
FIG. 18 is a view illustrating operations performed by an electronic device according to various embodiments of the disclosure.

An example of the electronic device 101 obtaining an image through the at least one camera module 420, 430, 440, and 450 is shown in FIG. 18. FIG. 18 is a view illustrating operations performed by an electronic device according to various embodiments of the disclosure. Referring to FIG. 18, the electronic device 101 may include a front camera 1810 and a camera module 400 positioned on the rear surface of the electronic device 101. The camera module 400 may include a first camera module 420, a second camera module 430, a third camera module 440, a fourth camera module 450, and a flash 402. The fourth camera module 450 may include a light emitting unit 452 and a light receiving unit 454. Further, the electronic device 101 may include a flexible printed circuit board 520, a first patch antenna 512, a second patch antenna 514, and a third patch antenna 516. Details of each component of the camera module 400, the flexible printed circuit board 520, the first patch antenna 512, the second patch antenna 514, and the third patch antenna 516 have been described above with reference to FIG. 5, and no duplicate description is thus given below.

In the example of FIG. 18, the at least one processor 120 of the electronic device 101 may obtain an image 1820 through at least one camera positioned on the rear surface, which is opposite to the surface where the display 160 is positioned, and display the obtained image 1820 on the display 160. The image 1820 displayed on the display 160 of the electronic device 101 may be a preview image or an image stored in response to the user's save command. A user-selectable function menu 1830 indicating various functions of the camera application may be displayed on the display 160 of the electronic device 101. The function menu 1830 may include at least one of an icon 1831 indicating an ultra-wide camera mode, an icon 1832 indicating a wide-angle camera mode, an icon 1833 indicating a telephoto camera mode, and an icon 1834 indicating a close-up camera mode. Among the icons included in the function menu 1830, the icon corresponding to the currently activated mode may be displayed differently from the other icons. For example, as in the example of FIG. 18, in a state in which the wide-angle camera mode is activated, a figure may be displayed around the icon 1832 indicating the wide-angle camera mode.

According to various embodiments, the configuration of at least one camera module included in the electronic device 101, modes of the camera included in the function menu 1830, and a visual display method of the function menu 1830 are not limited to the example shown in FIG. 18.

In operation 1720, the at least one processor 120 of the electronic device 101 may broadcast a ranging request message through at least one patch antenna (e.g., the first patch antenna 512, second patch antenna 514, or third patch antenna 516 of FIG. 18). The ranging request message may be, e.g., a POLL message.

Figure 19:
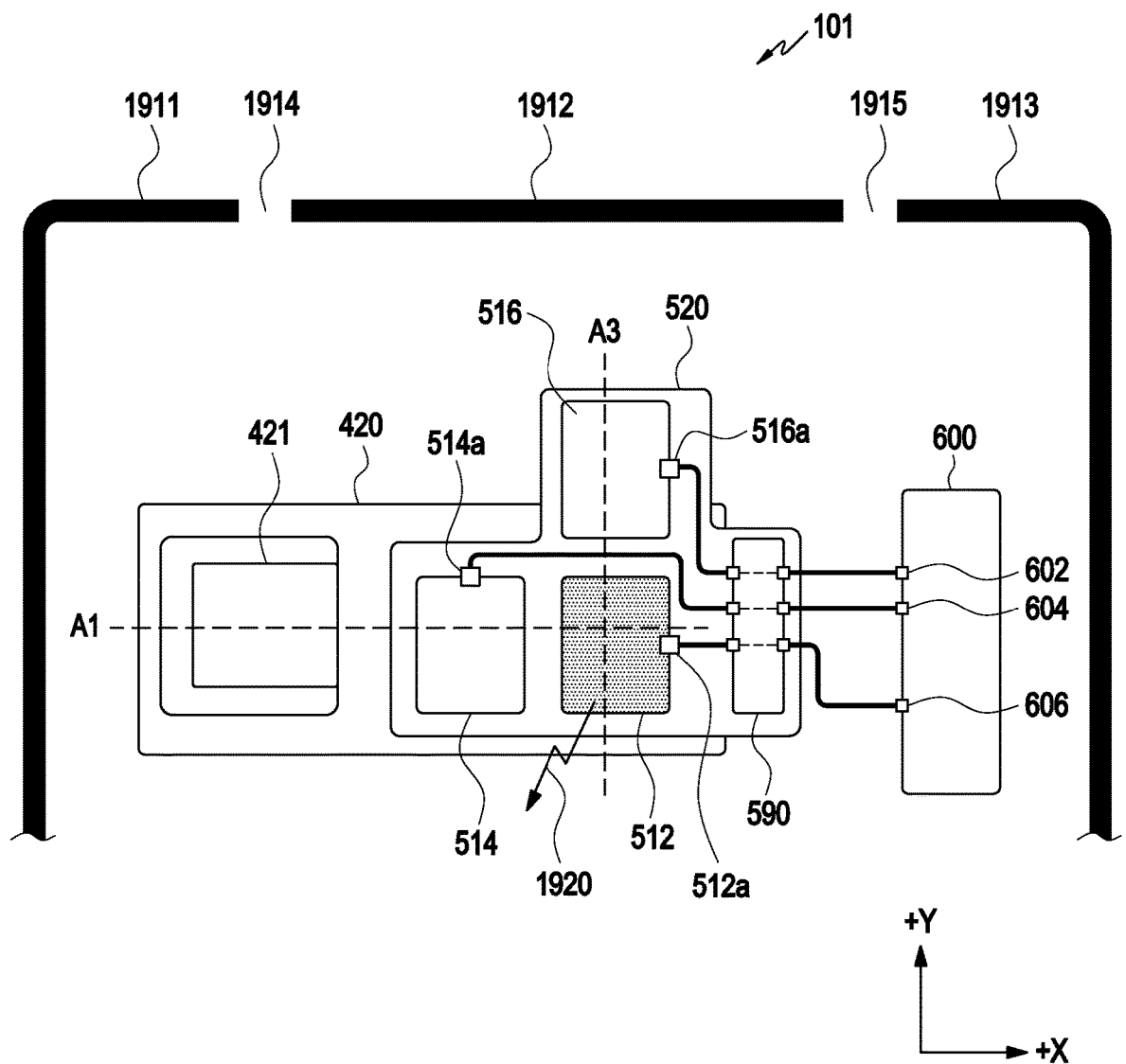
FIG. 19 is a view illustrating a patch antenna channel configuration of an electronic device broadcasting a ranging request message according to various embodiments of the disclosure.

An example of the patch antenna channel configuration of the electronic device broadcasting the ranging request message is shown in FIG. 19. Referring to FIG. 19, the electronic device 101 may include a housing including a plurality of frames 1911, 1912, and 1913. The plurality of frames 1911, 1912, and 1913 may be, e.g., metal frames. A slit 1914 may be formed between the frame 1911 and the frame 1912, and a slit 1915 may be formed between the frame 1912 and the frame 1913.

The first camera module 420, the flexible printed circuit board 520, and the antenna circuit 600 may be positioned in the housing of the electronic device 101. The first camera module 420 may include a prism 421. The first patch antenna 512, the second patch antenna 514, and the third patch antenna 516 may be positioned on the flexible printed circuit board 520. The antenna connecting terminal 590 may connect the first patch antenna 512, the second patch antenna 514, and the third patch antenna 516 to the antenna circuit 600. The antenna circuit 600 may be connected to the patch antenna 510 through a first communication port 602 and a second communication port 604, which are reception ports, and a third communication port 606, which is a third/reception port. The first patch antenna 512 may be electrically connected to the antenna connecting terminal 590 through the first feed 512a, and the second patch antenna 514 may be electrically connected to the antenna connecting terminal 590 through the second feed 514a. The third patch antenna 516 may be electrically connected to the antenna connecting terminal 590 through the third feed 516a.

Details of the first camera module 420, the prism 421, the flexible printed circuit board 520, the first patch antenna 512, the second patch antenna 514, the third patch antenna 516, the first feed 512a, the second feed 514a, the third feed 516a, the antenna circuit 600, the first communication port 602, the second communication port 604, and the third communication port 606 have been described above with reference to FIG. 5, and no duplicate description is thus given below.

Referring to FIG. 19, in operation 1720, at least one processor 120 of the electronic device 101 may control the antenna circuit 600 to broadcast a ranging request message 1920 through the first patch antenna 512 among the first patch antenna 512, the second patch antenna 514, and the third patch antenna 516.

According to various embodiments, at least one of the plurality of frames 1911, 1912, and 1913 of the electronic device 101 may be used to perform BLE communication. At least one processor 120 may establish a BLE connection with a first external electronic device and, upon identifying that a BLE connection with the first external electronic device is established, control the antenna circuit 600 to broadcast the ranging request message 1920 to the first external electronic device through the first patch antenna 512.

In operation 1730, the at least one processor 120 of the electronic device 101 may receive a ranging response message from the first external electronic device receiving the broadcast ranging request message 1920. According to an embodiment, the first external electronic device may be an authenticated device. For example, the first external electronic device may be a device registered by the user of the electronic device or a device BLE-connected with the electronic device 101. According to an embodiment, the first external electronic device may be a device capable of performing UWB communication.

According to an embodiment, the at least one processor 120 may receive the ranging response message from the first external electronic device through at least one patch antenna (e.g., the first patch antenna 512, second patch antenna 514, and third patch antenna 516 of FIG. 18). An example of a patch antenna channel configuration of the electronic device 101 receiving the ranging response message is described below with reference to FIG. 24. Other than the example of FIG. 24 in which three patch antennas are provided, according to various embodiments, the ranging response message may be received through a plurality of antennas.

A structure of a ranging response message is described below with reference to FIGS. 22A and 22B.

In operation 1740, the at least one processor 120 of the electronic device 101 may identify the relative position of the first external electronic device with respect to the electronic device based on the ranging response message. The relative position of the first external electronic device with respect to the electronic device may be specified by the distance between the first external electronic device and the electronic device and the angle of arrival of the signal arriving at the electronic device from the first external electronic device. According to an embodiment, the at least one processor 120 may identify the angle of arrival corresponding to the first external electronic device by the process described above in connection with FIG. 9.

According to an embodiment, the first external electronic device may be a device which is not clock-synchronized with the electronic device 101, and the at least one processor 120 may identify the distance between the first external electronic device and the electronic device using a two way ranging (TWR) scheme. For example, the at least one processor 120 may identify the distance between the first external electronic device and the electronic device by a single sided-two way ranging (SS-TWR) scheme or a double sided-two way ranging (DS-TWR) scheme.

In the single sided-two way ranging (SS-TWR) scheme, the at least one processor 120 may identify the round trip time (RTT) by subtracting the time when the ranging request message is broadcast from the time when the ranging response message is received. The at least one processor 120 may identify the time of flight (TOF) using the RTT and the reply time (RT) included in the ranging response message, as follows.

$$TOF = \frac{1}{2}(RTT - RT) \qquad [\text{Equation 4}]$$

The at least one processor 120 may identify the distance between the first external electronic device and the electronic device based on the identified TOF.

Figure 20:
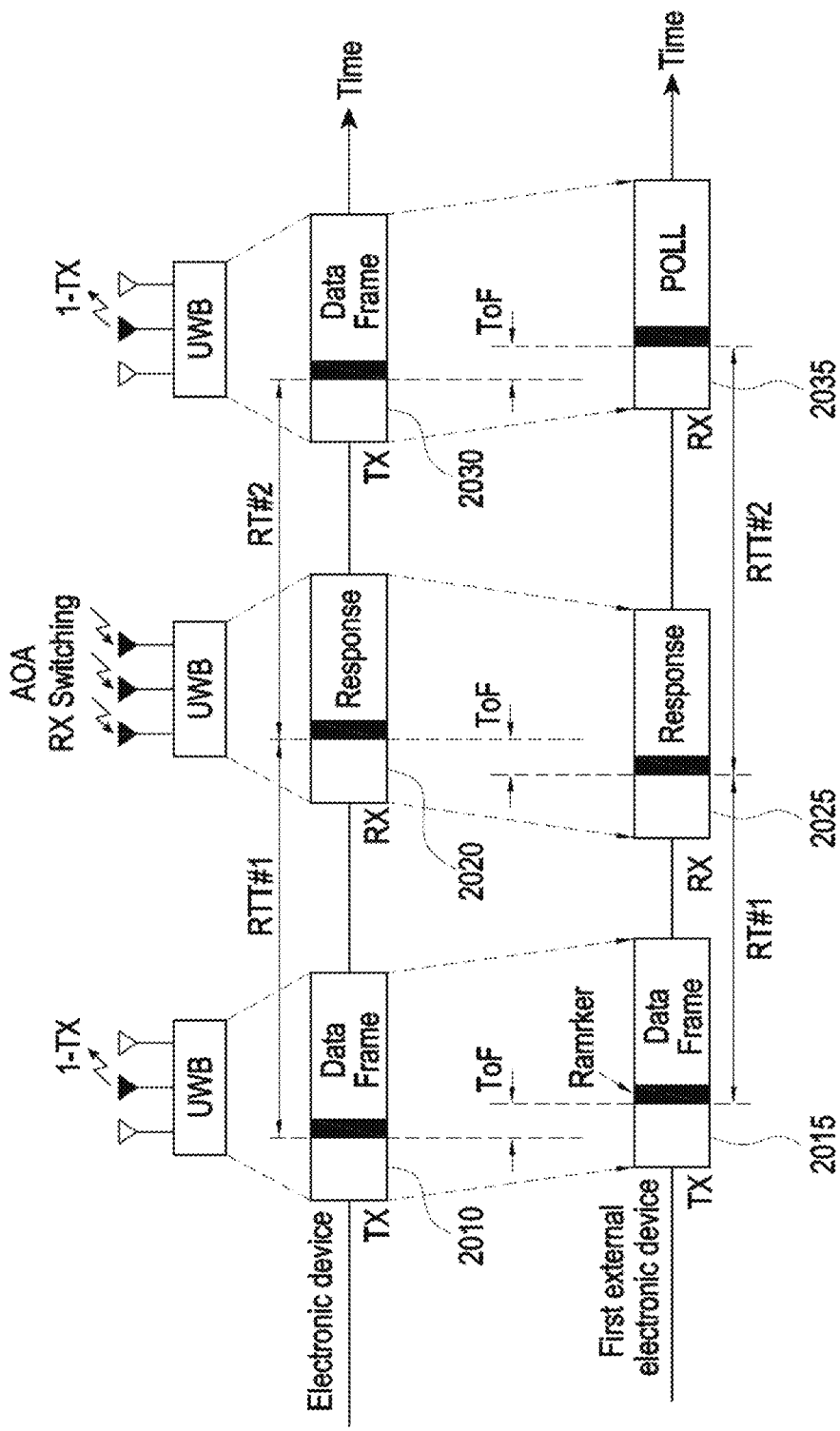
FIG. 20 is a view illustrating signals communicated between an electronic device and a first external electronic device according to various embodiments of the disclosure.

In the double sided-two way ranging (DS-TWR) scheme, the at least one processor 120 of the electronic device 101 may communicate with the first external electronic device as shown in FIG. 20. Referring to FIG. 20, the electronic device 101 may broadcast a first ranging request message 2010, receive a ranging response message 2020 from the first external electronic device, and transmit a second ranging request message 2030 to the first external electronic device. The first external electronic device may receive the first ranging request message 2015 broadcast by the electronic device 101, transmit a ranging response message 2025 to the electronic device 101, and receive a second ranging request message 2035 from the electronic device 101. It will be appreciated by one of ordinary skill in the art that in FIG. 20, the first ranging request message 2010 broadcast from the electronic device 101 and the first ranging request message 2015 received by the first external electronic device are messages containing the same content but, since the time of broadcasting the first ranging request message 2010 from the electronic device 101 and the time of receiving the first ranging request message 2015 from the first external electronic device differ from each other, the first ranging request message 2010 broadcast from the electronic device 101 and the first ranging request message 2015 received by the first external electronic device are indicated by different reference denotations for clearly describing the timings. The same is also applied to the ranging response message 2020 received by the electronic device 101 and the ranging response message 2025 transmitted by the first external electronic device and the second ranging request message 2030 transmitted by the electronic device 101 and the second ranging request message 2035 received by the first external electronic device. The at least one processor 120 of the electronic device 101 may identify a first RTT RTT #1 using the time difference between the ranging markers RMARKERs respectively included in the first ranging request message 2010 and the ranging response message 2020 and identify a second RT RT #2 using the time difference between the RMARKERs respectively included in the ranging response message 2020 and the second ranging request message 2030.

The first external electronic device may identify the first RT RT #1 using the time difference between the RMARKERS respectively included in the first ranging request message 2015 and the ranging response message 2025 and identify the second RTT RTT #2 using the time difference between the RMARKERs respectively included in the ranging response message 2025 and the second ranging request message 2035.

The relationship between RTT #1, RT #1, and TOF may be represented as in Equation 5.

$$RTT\ \#2 = 2TOF + RT\ \#2 \quad \text{[Equation 5]}$$

The relationship between RTT #2, RT #2, and TOF may be represented as in Equation 6.

$$RTT\ \#2 = 2TOF + RT\#2 \quad \text{[Equation 6]}$$

The at least one processor 120 of the electronic device 101 may identify the TOF by Equation 7.

$$TOF = \frac{1}{4}((RTT\#1 - RT\#1) + (RTT\#2 - RT\#2)) \quad \text{[Equation 7]}$$

The at least one processor 120 of the electronic device 101 may identify the distance between the first external electronic device and the electronic device based on the identified TOF.

Referring to FIG. 20, the at least one processor 120 of the electronic device 101 may control the antenna circuit 600 to activate one patch antenna among the plurality of patch antennas included in the electronic device 101 to broadcast the ranging request message 2010 or transmit the ranging request message 2030. Further, to receive the ranging response message 2020, the at least one processor 120 may control the antenna circuit 600 to activate at least some of the plurality of patch antennas included in the electronic device 101.

In operation 1750, the at least one processor 120 of the electronic device 101 may identify a first area corresponding to the first external electronic device in the image obtained through at least one camera module, based on the relative position of the first external electronic device with respect to the electronic device. For example, the first area may be a face area of the person closest to the position of the first external electronic device in the image. In another example, the first area may be an area over the head of the person closest to the position of the first external electronic device in the image. According to an embodiment, the at least one processor 120 of the electronic device 101 may transmit the image obtained through at least one camera module to an external server through a communication module (e.g., the communication module 190 of FIG. 1), receive information about what area of the image is the person's face area from the external server, and determine the first area based on the received information. According to another embodiment, the at least one processor 120 of the electronic device 101 may determine the first area by performing processing on the image obtained through at least one camera module.

In operation 1760, the at least one processor 120 of the electronic device 101 may overlay the graphic object corresponding to the first external electronic device on the first area and display them on the display 160. For example, the graphic object may indicate at least one of a graphic image preset by the user of the first external electronic device, a name preset by the user of the first external electronic device, or text preset by the user of the first external electronic device. According to an embodiment, the at least one processor 120 may determine the graphic object corresponding to the first external electronic device based on the ranging response message.

Figure 21A:
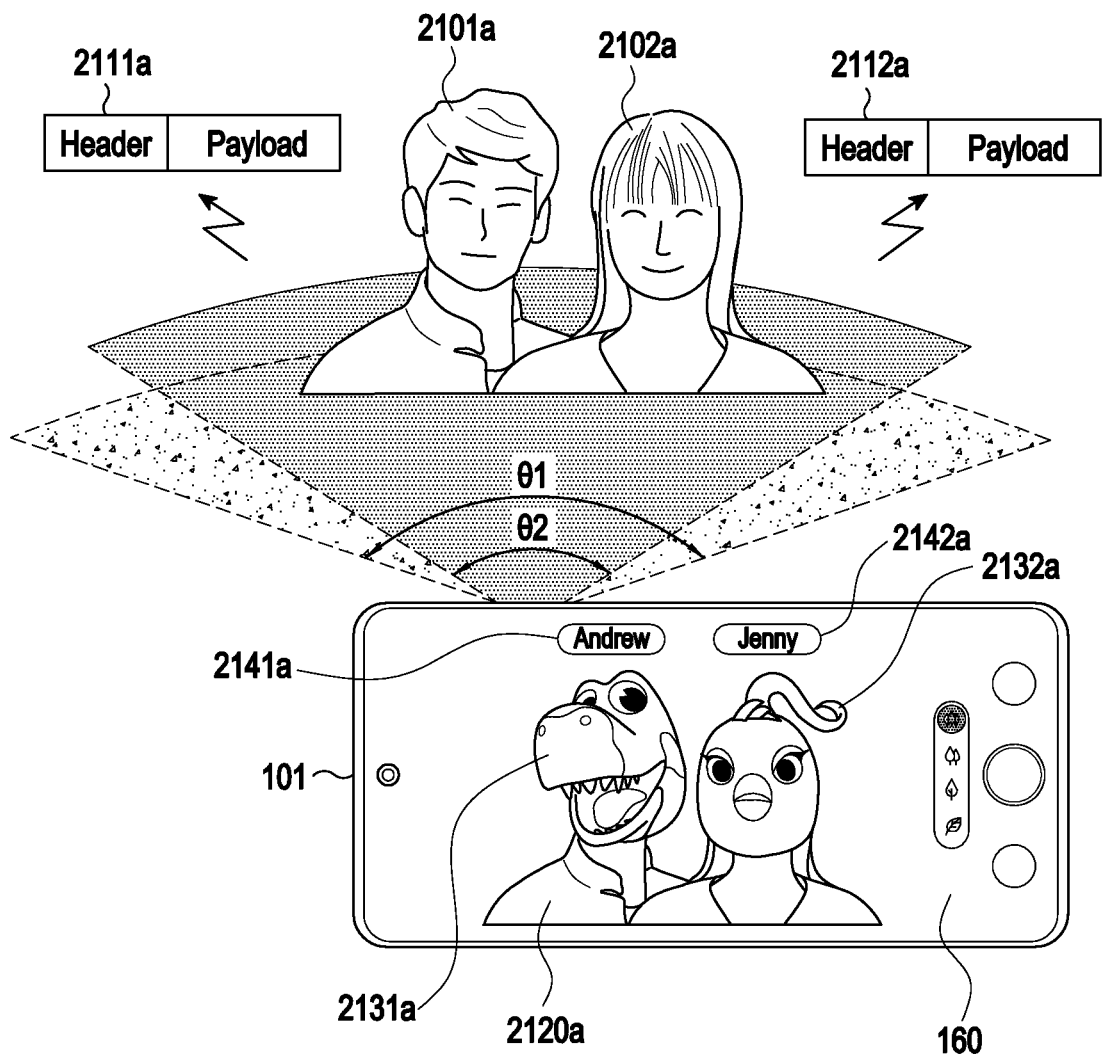
FIG. 21A is a view illustrating operations performed by an electronic device according to various embodiments of the disclosure.

FIG. 21A is a view illustrating operations performed by an electronic device according to various embodiments of the disclosure. Referring to FIG. 21, an image 2120*a* which has a user 2101*a* of a first electronic device and a user 2102*a* of a second electronic device as subjects may be displayed on the display 160. The electronic device 101 may detect an angle of arrival up to a first angle θ1 and detect an image up to a second angle θ2. The electronic device 101 may receive a first ranging response message 2111*a* from the first electronic device and a second ranging response message 2112*a* from the second electronic device, for the ranging request message broadcast by the electronic device 101.

According to an embodiment, the first ranging response message 2111*a* may include information about the name of the user 2101*a* of the first electronic device and information about the character image set by the user 2101*a* of the first electronic device. The second ranging response message 2112*a* may include information about the name of the user 2102*a* of the second electronic device and information about the character image set by the user 2102*a* of the second electronic device.

The at least one processor 120 of the electronic device 101 may identify that the image 2120*a* includes two faces, the left face corresponds to the first external electronic device, and the right face corresponds to the second external electronic device, based on analysis of the image 2120*a* and relative positions of the first external electronic device and the second external electronic device with respect to the electronic device 101 identified in operation 1740.

Thereafter, the at least one processor 120 may overlay and display, on the image 2120*a*, the graphic object 2141*a* indicating the name of the user 2101*a* of the first electronic device in the area corresponding to an upper end of the left face of the image 2120*a* based on the information about the name of the user 2101*a* of the first electronic device included in the first ranging response message 2111*a*. Further, the at least one processor 120 may overlay and display, on the image 2120*a*, the graphic object 2131*a* indicating the character image set by the user 2101*a* in the area corresponding to the left face in the image 2120*a*, based on the information about the character image set by the user 2101*a* of the first electronic device, included in the first ranging response message 2111*a*. The at least one processor 120 may overlay and display, on the image 2120*a*, the graphic object 2142*a* indicating the name of the user 2102*a* of the second electronic device in the area corresponding to an upper end of the left face of the image 2120*a* based on the information about the name of the user 2102*a* of the second electronic device included in the second ranging response message 2112*a*. Further, the at least one processor 120 may overlay and display, on the image 2120*a*, the graphic object 2132*a* indicating the character image set by the user 2102*a* in the area corresponding to the left face in the image 2120*a*, based on the information about the character image set by the user 2102*a* of the second electronic device, included in the second ranging response message 2112*a*.

Figure 21B:
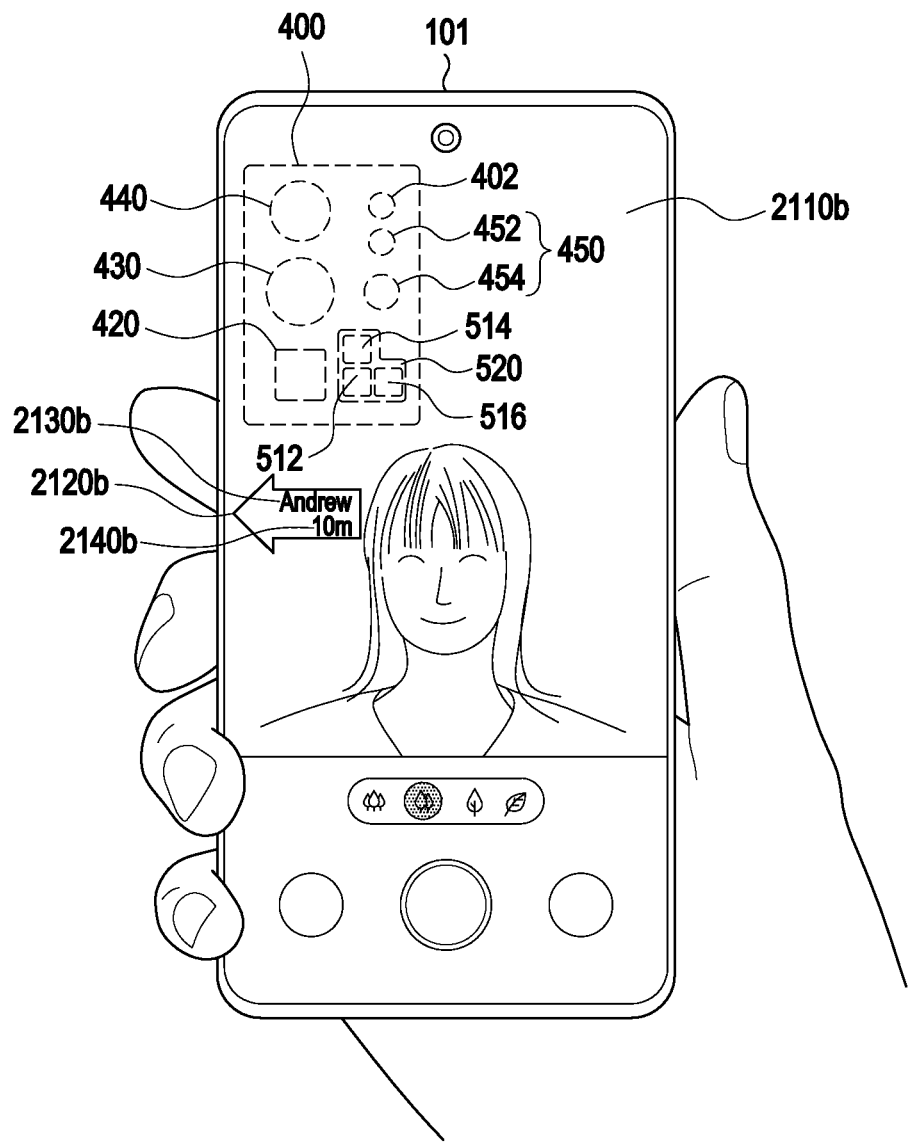
FIG. 21B is a view illustrating a screen displayed on an electronic device according to various embodiments of the disclosure.

FIG. 21B illustrates an example of a screen displayed on the electronic device 101 in operation 1760 when the image obtained in operation 1710 does not include the subject corresponding to the first external electronic device according to various embodiments of the disclosure. Referring to FIG. 21B, the image 2110*b* obtained through operation 1710 may not include the subject corresponding to the first external electronic device, e.g., the user holding the first external electronic device. In this case, in operation 1750, the at least one processor 120 of the electronic device 101 may identify that the left area of the subject of the background area where the subject is not displayed in the image 2110*b* is the first area where the graphic object is to be displayed, based on the relative position of the first external electronic device with respect to the electronic device 101, identified in operation 1740.

In the example of FIG. 21B, the at least one processor 120 of the electronic device 101 may overlay and display, in the first area, the graphic objects 2120*b*, 2130*b*, and 2140*b* indicating the relative position of the first external electronic device with respect to the gaze corresponding to the image 2110*b* in operation 1760. The graphic object 2120*b* may be identified based on the relative position of the first external electronic device with respect to the electronic device 101, identified in operation 1740, and indicate the direction in which the first external electronic device is positioned with respect to the gaze corresponding to the image 2110*b*. The graphic object 2130*b* may indicate the name of the user of the first electronic device included in the ranging response message received from the first external electronic device. The graphic object 2140*b* may be identified based on the relative position of the first external electronic device with respect to the electronic device 101 identified in operation 1740 and may indicate the distance from the position of the area corresponding to the image 2110*b* to the first external electronic device.

Figure 22A:
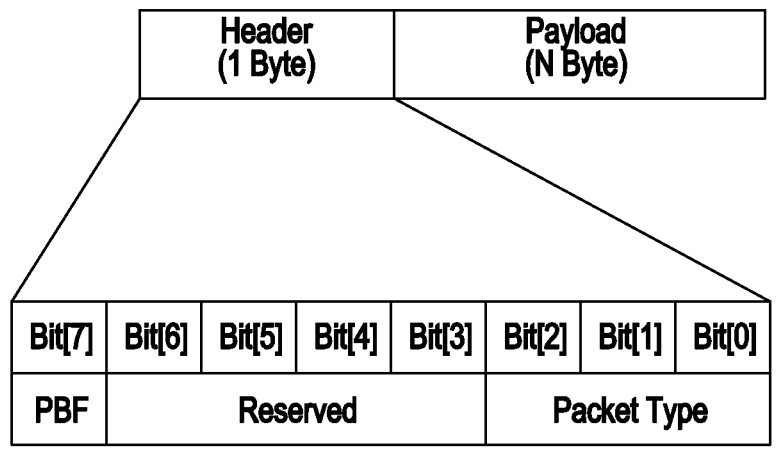
FIGS. 22A and 22B are views illustrating a structure of a ranging response message according to various embodiments of the disclosure.
Figure 22B:
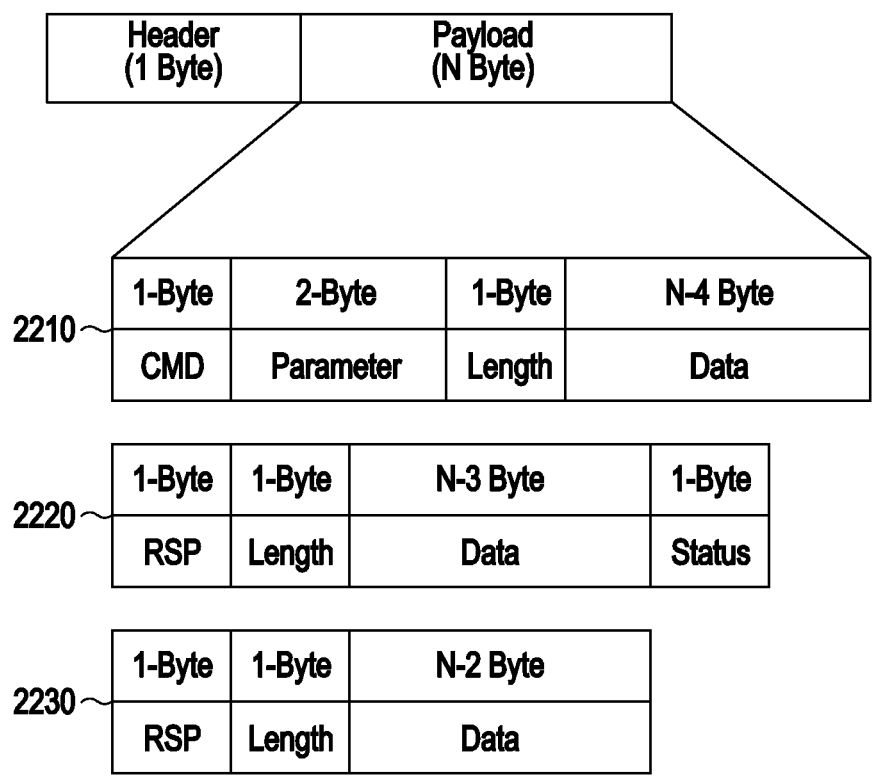

FIGS. 22A and 22B are views illustrating a structure of a ranging response message according to various embodiments of the disclosure. FIG. 22A shows an example structure of a header of a ranging response message. Referring to FIG. 22A, the header of the ranging response message may consist of 8 bits among which 1 bit may be allocated to the PBF, 4 bits are allocated to the reserved field, and 3 bits may be allocated to indicate the packet type. The PBF may indicate whether the packet contains the entire message or a portion of the message. The packet type may include a command packet, a response packet, and a notification packet.

FIG. 22B shows an example structure of the payload of the ranging response message. Referring to FIG. 22B, the payload of the ranging response message may consist of N bytes and may have a first structure 2210 in which N-4 bytes are allocated to data, a second structure 2220 in which N-3 bytes are allocated to data, or a third structure 2230 in which N-2 bytes are allocated to data.

Figure 23:
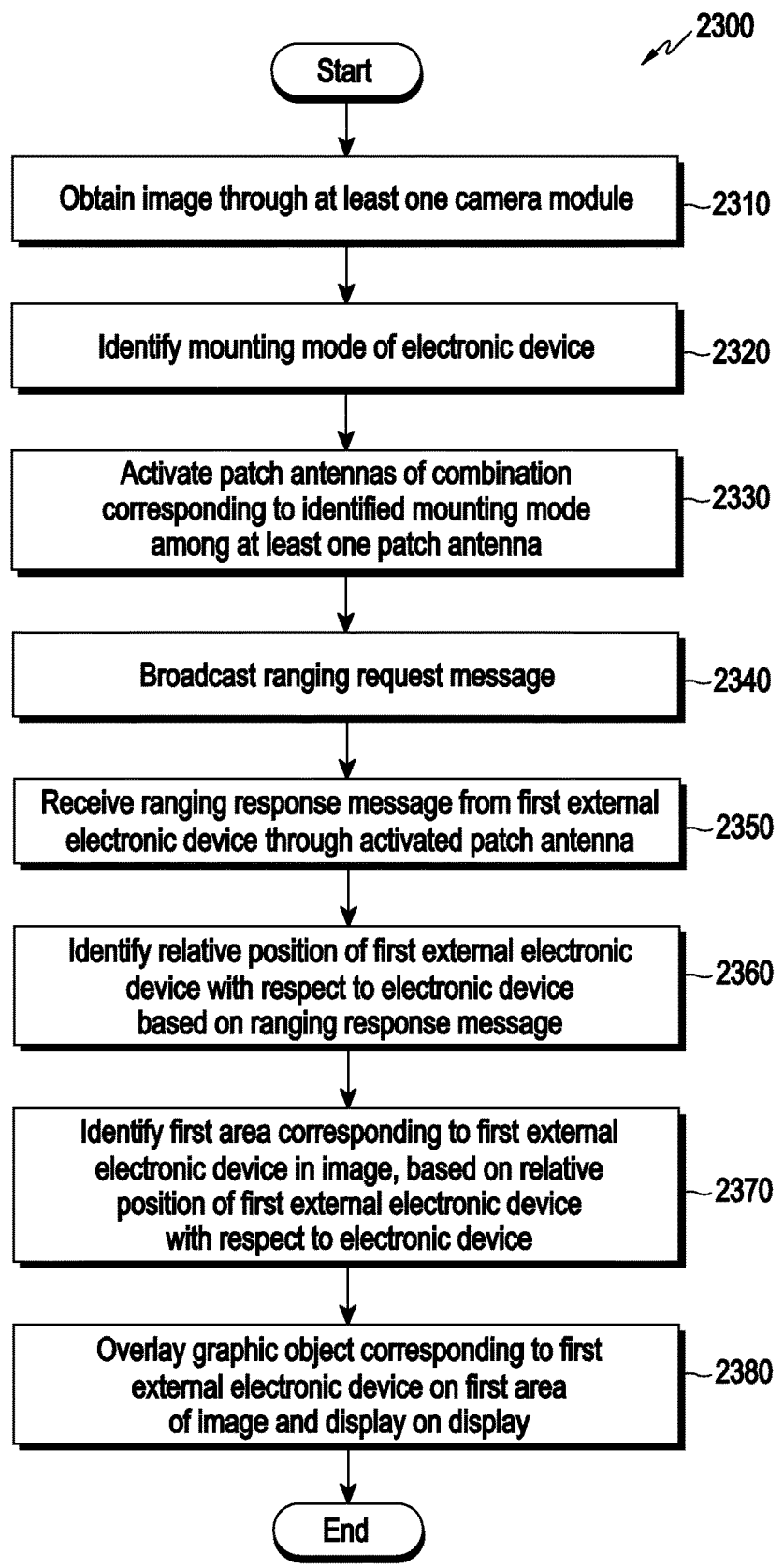
FIG. 23 is a flowchart illustrating operations performed by an electronic device according to various embodiments of the disclosure.

FIG. 23 is a flowchart illustrating operations performed by an electronic device according to various embodiments of the disclosure. In operation 2310, at least one processor (e.g., the processor 120) of the electronic device (e.g., the electronic device 101) may obtain an image through at least one camera module (e.g., the first camera module 420, the second camera module 430, the third camera module 440, and the fourth camera module 450). Since the details described above in connection with operation 1710 of FIG. 17 may apply likewise to operation 2310, no repetitive description is given below.

In operation 2320, at least one processor 120 of the electronic device 101 may identify the mounting mode of the electronic device 101. According to an embodiment, the at least one processor 120 may identify the mounting mode of the electronic device 101 based on the angle detected through the sensor module (e.g., the sensor module 176 of FIG. 1) configured to detect the angle of the electronic device 101. According to an embodiment, the mounting mode of the electronic device 101 may identify as either a first mounting mode or a second mounting mode. For example, the first mounting mode may be a portrait mode, and the second mounting mode may be a landscape mode.

In operation 2330, the at least one processor 120 of the electronic device 101 may activate one or more patch antennas of a combination corresponding to the mounting mode identified among at least one patch antenna 512, 514, and 516. According to various embodiments, among the at least one patch antenna 512, 514, and 516, the first patch antenna 512 may be activated for all the mounting modes. In operation 2340, the first patch antenna 512 may be used to broadcast a ranging request message. One or more patch antennas activated in operation 2330 may be used to receive a ranging response message in operation 2350.

Figure 24:
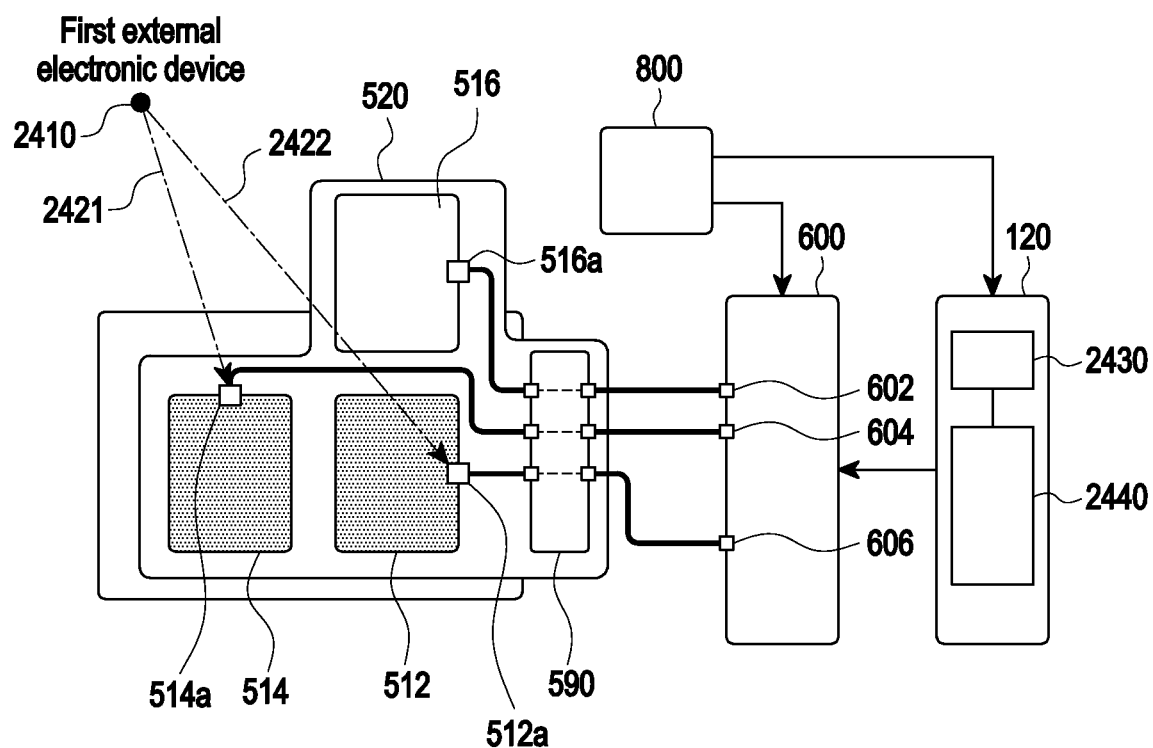
FIG. 24 is a view illustrating a patch antenna channel configuration of an electronic device receiving a ranging response message according to various embodiments of the disclosure.

An example of a combination of patch antennas activated corresponding to the mounting mode is described with reference to FIG. 24. FIG. 24 is a view illustrating a patch antenna channel configuration of an electronic device receiving a ranging response message according to various embodiments of the disclosure.

Referring to FIG. 24, the first patch antenna 512, the second patch antenna 514, and the third patch antenna 516 may be positioned on the flexible printed circuit board 520. The antenna connecting terminal 590 may connect the first patch antenna 512, the second patch antenna 514, and the third patch antenna 516 to the antenna circuit 600. The antenna circuit 600 may be connected to the patch antenna 510 through a first communication port 602 and a second communication port 604, which are reception ports, and a third communication port 606, which is a third/reception port. The first patch antenna 512 may be electrically connected to the antenna connecting terminal 590 through the first feed 512*a*, and the second patch antenna 514 may be electrically connected to the antenna connecting terminal 590 through the second feed 514*a*. The third patch antenna 516 may be electrically connected to the antenna connecting terminal 590 through the third feed 516*a*.

The electronic device 101 may include a sensor module 800 and at least one processor 120. The at least one processor 120 may receive a signal based on the angle of the electronic device 101 from the sensor module 800 through the sensor interface 2430. The at least one processor 120 may include an environment control circuit 2440, identify the mounting mode based on the angle of the electronic device 101 through the environment control circuit 2440, and control the antenna circuit 600 to activate the patch antennas of the combination corresponding to the identified mounting mode.

Or, in an embodiment, the sensor module 800 may identify the mounting mode based on the measurement value regarding the angle of the electronic device 101 and control the antenna circuit 600 to activate the patch antennas of the combination of the identified mounting mode.

In the example of FIG. 24, the direction in which the second patch antenna 514 is positioned with respect to the first patch antenna 512 may be defined as a first direction, and the direction in which the third patch antenna 516 is positioned with respect to the first patch antenna 512 may be defined as a second direction. In this case, the first direction may be substantially perpendicular to the second direction.

When the mounting mode of the electronic device 101 is identified as the first mounting mode in which the first direction is parallel to the ground as shown in FIG. 24, the at least one processor 120 may control the antenna circuit 600 to activate the first patch antenna 512 and the second patch antenna 514. The activated first patch antenna 512 and the second patch antenna 514 may receive the ranging response message transmitted from the first external electronic device 2410. As described above in connection with FIG. 9, the angle of arrival corresponding to the first external electronic device 2410 may be identified based on the phase difference between the signal 2421 corresponding to the ranging response message received by the first patch antenna 512 and the signal 2422 corresponding to the ranging response message received by the second patch antenna 514.

Or, in an example different from that shown in FIG. 24, when the mounting mode of the electronic device 101 is identified as the second mounting mode in which the second direction is parallel to the ground, the at least one processor 120 may control the antenna circuit 600 to activate the first patch antenna 512 and the third patch antenna 516.

Although FIG. 24 illustrates an example in which the electronic device 101 includes three patch antennas disposed in an "inverted L" shape, according to various embodiments, the number and arrangement of antenna patches, definition of the mounting mode, and the combination of the antenna patches corresponding to the mounting mode are not limited to the example shown in FIG. 22.

In operation 2340, the at least one processor 120 of the electronic device 101 may broadcast a ranging request message through at least one of the patch antennas activated in operation 2330. Since the details described above in connection with operation 1720 of FIG. 17 may apply likewise to operation 2340, no repetitive description is given below.

In operation 2350, the at least one processor 120 of the electronic device 101 may receive the ranging response message from the first external electronic device through the one or more patch antennas activated in operation 2330. Since the details described above in connection with operation 1730 of FIG. 17 may apply likewise to operation 2350, no repetitive description is given below.

In operation 2360, the at least one processor 120 of the electronic device 101 may identify the relative position of the first external electronic device with respect to the electronic device 101 based on the ranging response message. Since the details described above in connection with operation 1740 of FIG. 17 may apply likewise to operation 2360, no repetitive description is given below.

In operation 2370, the at least one processor 120 of the electronic device 101 may identify a first area corresponding to the first external electronic device in the image obtained through at least one camera module, based on the relative position of the first external electronic device with respect to the electronic device. Since the details described above in connection with operation 1750 of FIG. 17 may apply likewise to operation 2370, no repetitive description is given below.

In operation 2380, the at least one processor 120 of the electronic device 101 may overlay the graphic object corresponding to the first external electronic device on the first area and display them on the display 160. Since the details described above in connection with operation 1760 of FIG. 17 may apply likewise to operation 2380, no repetitive description is given below.

According to various embodiments of the disclosure, an electronic device (e.g., the electronic device 101 of FIG. 5) may comprise a housing (e.g., the housing 310 of FIG. 2), a first camera module (e.g., the first camera module 420 of FIG. 5) disposed in the housing and including a first camera housing (e.g., the first camera housing 425 of FIG. 6), a prism (e.g., the prism 421 of FIG. 6) disposed in the first camera housing and configured to refract light transferred from outside of the electronic device, and an image sensor (e.g., the image sensor 422 of FIG. 6) disposed in the first camera housing and configured to obtain the light through the prism, and an antenna module (e.g., the antenna module 500 of FIG. 5) having at least a portion disposed on the first camera module.

According to various embodiments, the electronic device may further comprise a camera module (e.g., the camera module 400 of FIG. 5) in which the first camera module is disposed. The camera module may include a camera window (e.g., the camera window 410 of FIG. 5) forming at least a portion of an exterior of the camera module. At least a portion of the antenna module may be disposed between the camera window and the first camera module.

According to various embodiments, the first camera module may include a first lens assembly (e.g., the lens assembly 423 of FIG. 6) disposed between the prism and the image sensor and facing the image sensor. The camera module may include a second camera module (e.g., the second camera module 430 of FIG. 5) facing the camera window.

According to various embodiments, the camera window may include a first transparent area (e.g., the first transparent area 412 of FIG. 11) for providing a path of light towards the first lens assembly, at least one second transparent area (e.g., the second transparent area 416 of FIG. 11) for providing a path of light towards the second camera module, and a printing area (e.g., the printing area 414 of FIG. 11) surrounding the first transparent area and the second transparent area. At least a portion of the antenna module may be disposed between the printing area and the first camera module.

According to various embodiments, the housing may include a front plate (e.g., the front plate 302 of FIG. 2) and a rear plate (e.g., the rear plate 380 of FIG. 4). At least a portion of the antenna module may be disposed between the rear plate and the first camera module.

According to various embodiments, the camera module may include a first camera supporting member (e.g., the first camera supporting member 460 of FIG. 7) supporting the camera module. The antenna module may be disposed on the first camera supporting member.

According to various embodiments, the antenna module may include a first patch antenna (e.g., the first patch antenna 512 of FIG. 5) and a second patch antenna (e.g., the second patch antenna 514 of FIG. 5) that is spaced apart from the first patch antenna.

According to various embodiments, the antenna module may include a third patch antenna (e.g., the third patch antenna 516 of FIG. 5) that is spaced apart from the first patch antenna. The second patch antenna and the third patch antenna may be disposed in a direction substantially perpendicular to the first patch antenna.

According to various embodiments, the electronic device may further comprise a sensor module (e.g., the sensor module 176 of FIG. 1) configured to detect an angle of the electronic device from a ground, a processor (e.g., the processor 120 of FIG. 1) configured to determine a mounting mode of the electronic device based on the angle, and a switching circuit (e.g., the switching circuit 700 of FIG. 14) configured to selectively connect the second patch antenna or the third patch antenna to an antenna circuit (e.g., the antenna circuit 600 of FIG. 13) electrically connected with the processor.

According to various embodiments, the processor may be configured to control the switching circuit in a first connection state of being electrically connected with the first patch antenna and the second patch antenna in a first mounting mode and control the switching circuit in a second connection state of being electrically connected with the first patch antenna and the third patch antenna in a second mounting mode.

According to various embodiments of the disclosure, an electronic device 101 may comprise at least one camera module 420, 430, 440, and 450, at least one patch antenna 512, 514, and 516, a display 160, and at least one processor 120. The at least one processor 120 may be configured to obtain an image through the at least one camera module 420, 430, 440, and 450, broadcast a ranging request message through the at least one patch antenna 512, 514, and 516, receive a ranging response message from a first external electronic device receiving the ranging request message, through the at least one patch antenna 512, 514, and 516, identify a relative position of the first external electronic device with respect to the electronic device 101, based on the ranging response message, identify a first area corresponding to the first external electronic device in the image, based on the relative position of the first external electronic device with respect to the electronic device 101, and overlay a graphic object corresponding to the first external electronic device on the first area of the image and display on the display 160.

According to various embodiments, the electronic device 101 may further comprise a sensor module. The at least one processor 120 may be configured to identify a mounting mode of the electronic device 101 through the sensor module, activate patch antennas of a combination corresponding to the identified mounting mode among the at least one patch antenna 512, 514, and 516, the patch antennas of the combination corresponding to the mounting mode including a first patch antenna, broadcast the ranging request message through the first patch antenna, and receive the ranging response message through the activated patch antennas.

According to various embodiments, the at least one patch antenna 512, 514, and 516 may include the first patch antenna, a second patch antenna that is spaced apart from the first patch antenna in a first direction, and a third patch antenna that is spaced apart from the first patch antenna in a second direction, the first direction being substantially perpendicular to the second direction. The at least one processor 120 may be configured to activate the first patch antenna and the second patch antenna when the identified mounting mode corresponds to a state in which the first direction is parallel to a ground and activate the first patch antenna and the third patch antenna when the identified mounting mode corresponds to a state in which the second direction is parallel to the ground.

According to various embodiments, the at least one processor 120 may be configured to identify a distance between the first external electronic device and the electronic device 101 by a single sided-two way ranging (SS-TWR) scheme or a double sided-two way ranging (DS-TWR) scheme to identify the relative position of the first external electronic device with respect to the electronic device 101.

According to various embodiments, the graphic object may be determined based on the ranging response message.

According to various embodiments, the graphic object may indicate at least one of a graphic image preset by a user of the first external electronic device, a name preset by the user of the first external electronic device, or text preset by the user of the first external electronic device.

According to various embodiments, the first area may be a face area of a person closest to a position of the first external electronic device in the image.

According to various embodiments of the disclosure, a method performed by an electronic device including at least one patch antenna 512, 514, and 516 may comprise obtaining an image through at least one camera module 420, 430, 440, and 450 of the electronic device, broadcasting a ranging request message through the at least one patch antenna 512, 514, and 516, receiving a ranging response message from a first external electronic device receiving the ranging request message, through the at least one patch antenna 512, 514, and 516, identifying a relative position of the first external electronic device with respect to the electronic device 101, based on the ranging response message, identifying a first area corresponding to the first external electronic device in the image based on the relative position of the first external electronic device with respect to the electronic device 101, and overlaying a graphic object corresponding to the first external electronic device on the first area of the image and displaying on a display 160 of the electronic device 101.

According to various embodiments, the method may further comprise identifying a mounting mode of the electronic device 101 and activating patch antennas of a combination corresponding to the identified mounting mode among the at least one patch antenna 512, 514, and 516. The patch antennas of the combination corresponding to the mounting mode may include a first patch antenna. Broadcasting the ranging request message may be performed through the first patch antenna, and receiving the ranging response message may be performed through the activated patch antennas.

According to various embodiments, the at least one patch antenna 512, 514, and 516 may include the first patch antenna, a second patch antenna that is spaced apart from the first patch antenna in a first direction, and a third patch antenna that is spaced apart from the first patch antenna in a second direction. The first direction may be substantially perpendicular to the second direction. Activating the patch antennas of the combination corresponding to the identified mounting mode among the at least one patch antenna 512, 514, and 516 may include activating the first patch antenna and the second patch antenna when the identified mounting mode corresponds to a state in which the first direction is parallel to a ground and activating the first patch antenna and the third patch antenna when the identified mounting mode corresponds to a state in which the second direction is parallel to the ground.

What is claimed is:

1. An electronic device comprising:
a housing;
a first camera module at least partially disposed in the housing, the first camera module comprising:
  a camera window forming at least a portion of an exterior of the electronic device;
  a first camera housing disposed below the camera window;
  a prism disposed in the first camera housing and configured to refract light received from outside of the electronic device; and
  an image sensor disposed in the first camera housing and configured to obtain the light through the prism; and
an antenna module comprising a plurality of patch antennas configured to transmit or receive a signal, the plurality of patch antennas disposed between the camera window and the first camera housing.

2. The electronic device of claim 1,
wherein the plurality of patch antennas are disposed on the first camera housing of the first camera module.

3. The electronic device of claim 2, wherein the first camera module comprises a first lens assembly disposed between the prism and the image sensor and facing the image sensor, and
wherein the electronic device further comprises a second camera module facing the camera window.

4. The electronic device of claim 3, wherein the camera window comprises:
a first transparent area configured to provide a path of light towards the first lens assembly;
at least one second transparent area configured to provide a path of light towards the second camera module; and
a printing area surrounding the first transparent area and the at least one second transparent area, and
wherein at least the portion of the antenna module is disposed between the printing area and the first camera module.

5. The electronic device of claim 1, wherein the housing comprises a front plate and a rear plate, and
wherein at least the portion of the antenna module is disposed between the rear plate and the first camera module.

6. The electronic device of claim 5, wherein the first camera module comprises a first camera supporting member supporting the first camera module, and
wherein the antenna module is disposed on the first camera supporting member.

7. The electronic device of claim 1, wherein the plurality of patch antennas of the antenna module comprises a first patch antenna and a second patch antenna that is spaced apart from the first patch antenna.

8. The electronic device of claim 7, wherein the antenna module further comprises a third patch antenna that is spaced apart from the first patch antenna, and
wherein the second patch antenna and the third patch antenna are arranged in a direction substantially perpendicular to the first patch antenna.

9. The electronic device of claim 8, further comprising:
a sensor module configured to detect an angle of the electronic device from a ground;
a processor configured to determine a mounting mode of the electronic device based on the angle;
an antenna circuit electrically connected with the processor; and
a switching circuit configured to selectively connect the second patch antenna or the third patch antenna to the antenna circuit,
wherein the processor is further configured to:
  control the switching circuit in a first connection state of being electrically connected with the first patch antenna and the second patch antenna in a first mounting mode; and
  control the switching circuit in a second connection state of being electrically connected with the first patch antenna and the third patch antenna in a second mounting mode.

10. The electronic device of claim 8, wherein at least a portion of the third patch antenna is on the first camera module.

11. The electronic device of claim 1, further comprising:
a display; and
a processor configured to:
  control the first camera module to obtain an image;
  broadcast a ranging request message through the antenna module;
  receive, through the antenna module, a ranging response message from a first external electronic device that received the ranging request message;
  identify a relative position of the first external electronic device with respect to the electronic device, based on the ranging response message;
  identify a first area corresponding to the first external electronic device in the image, based on the relative position of the first external electronic device with respect to the electronic device; and
  control the display to display a graphic object corresponding to the first external electronic device overlaid on the first area of the image.

* * * * *